Figure 1:
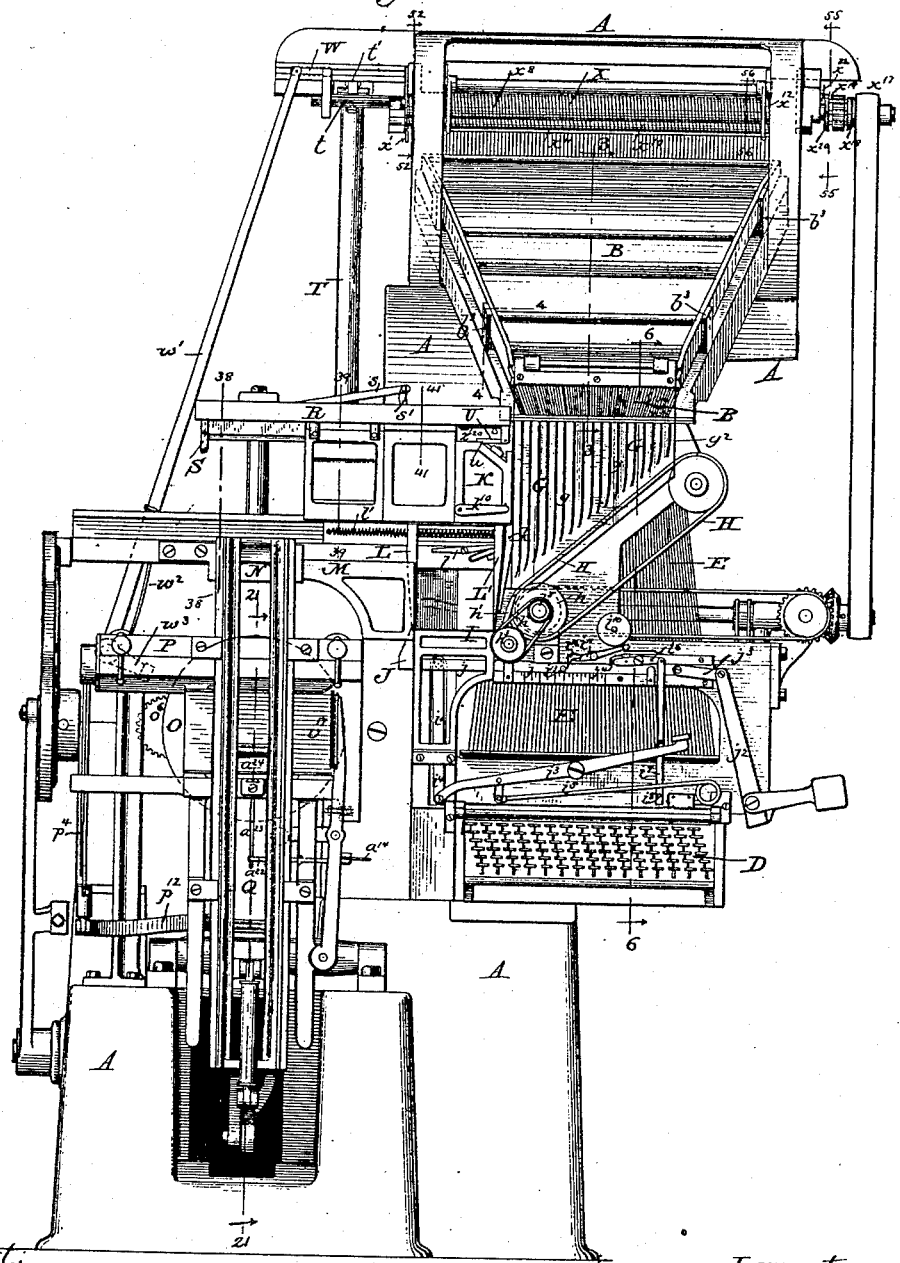
Figure 46:
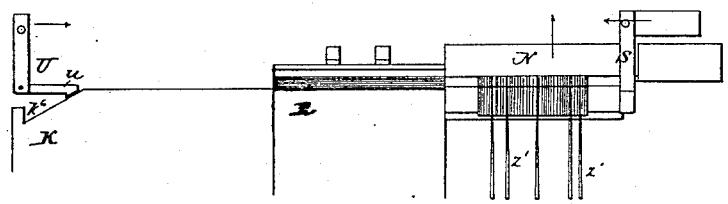
Figure 47:
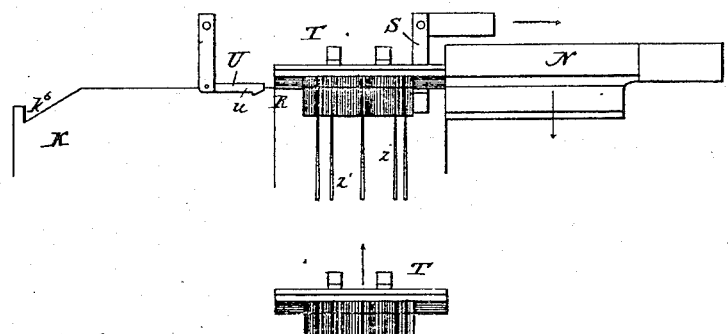

(No Model.) 23 Sheets—Sheet 1.

O. MERGENTHALER.
MACHINE FOR PRODUCING LINOTYPES, TYPE MATRICES, &c.

No. 436,532. Patented Sept. 16, 1890.

Attest:
Sidney P. Hollingsworth
N. A. Kennedy

Inventor:
Ottmar Mergenthaler
By his Atty
Phil. T. Dodge

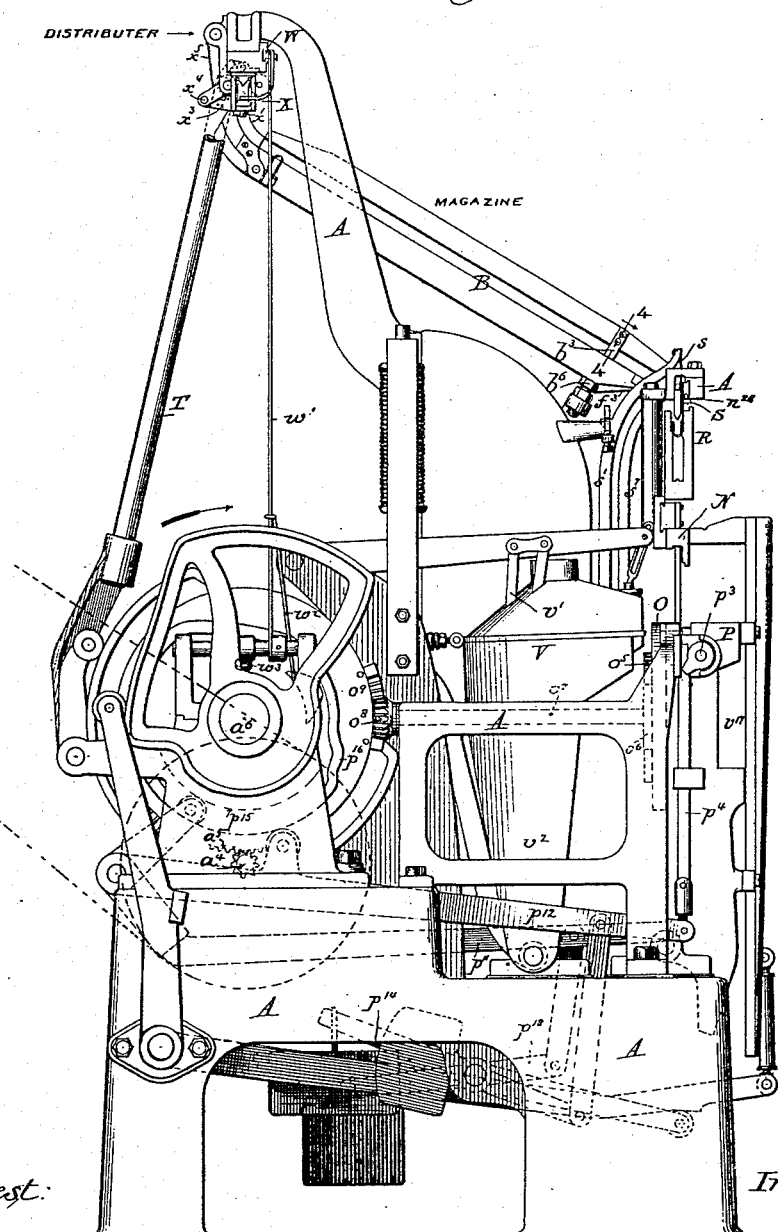

(No Model.) 23 Sheets—Sheet 3.
O. MERGENTHALER.
MACHINE FOR PRODUCING LINOTYPES, TYPE MATRICES, &c.
No. 436,532. Patented Sept. 16, 1890.
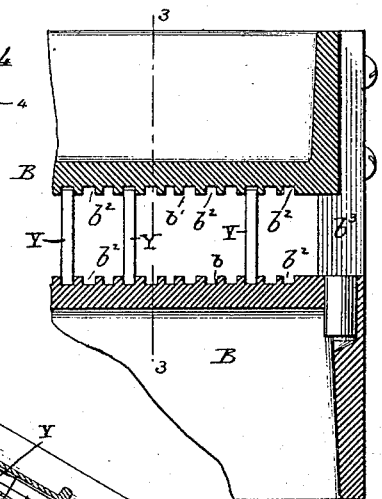
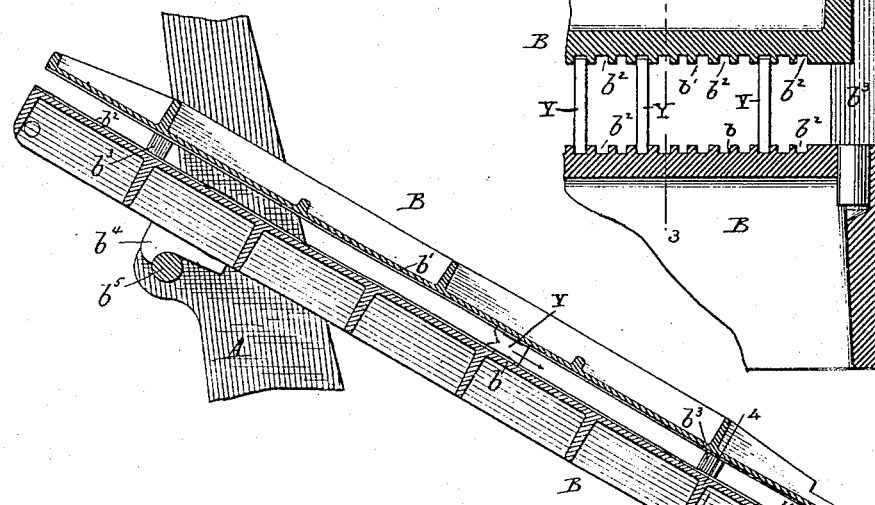
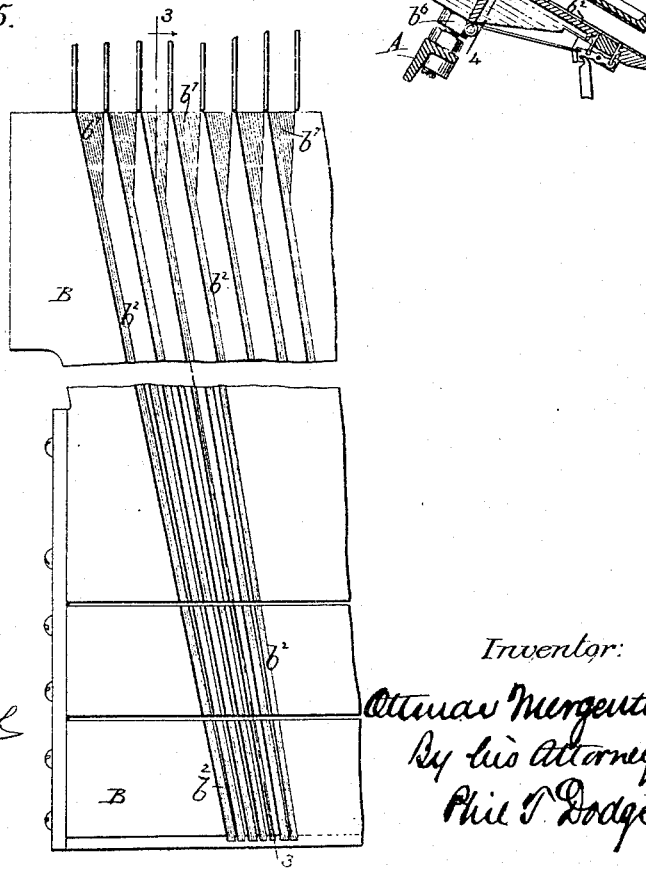
Attest:
Sidney P. Hollingsworth
N. R. Kennedy
Inventor:
Ottmar Mergenthaler
By his Attorney
Phil T. Dodge

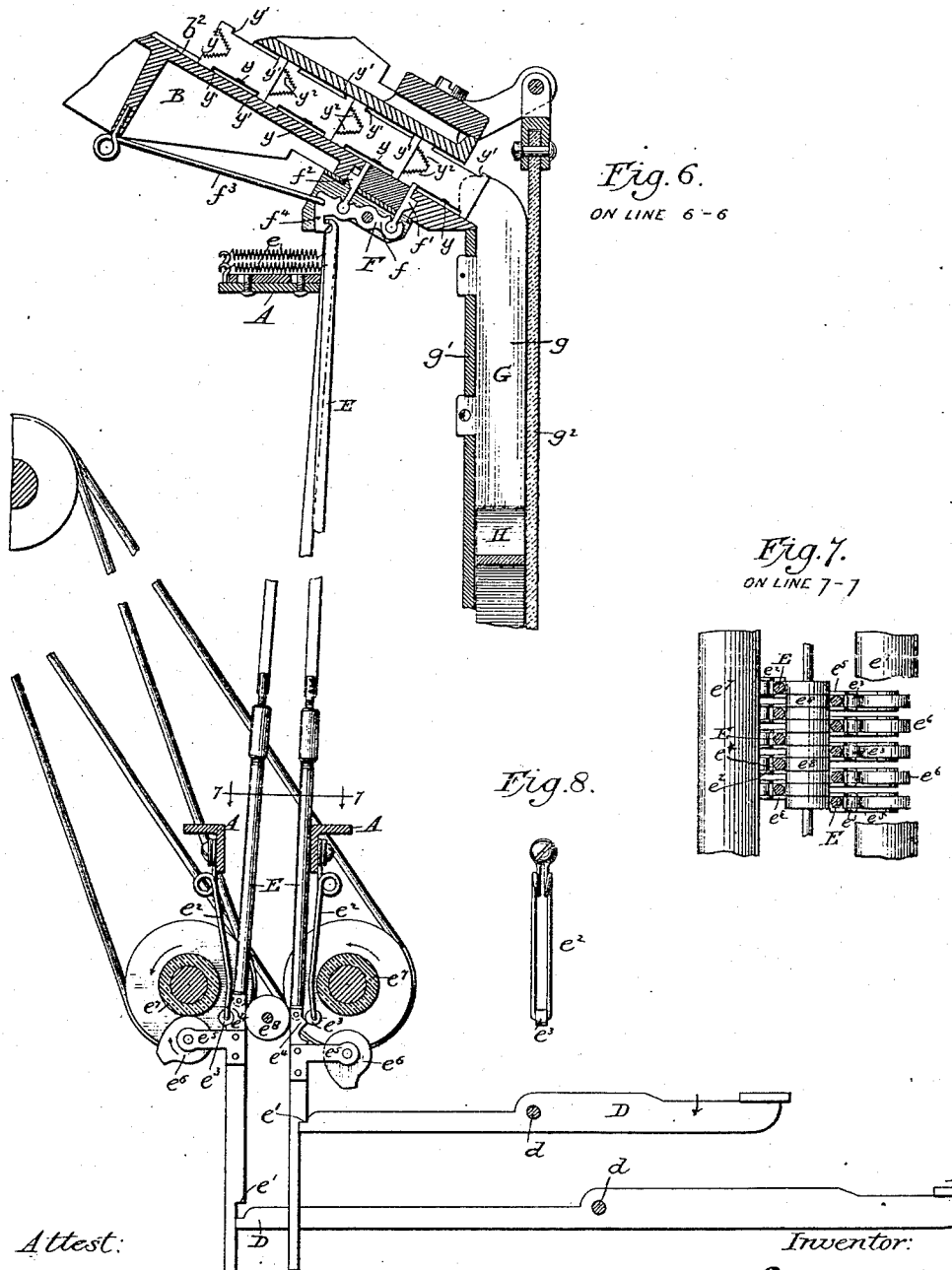

(No Model.) 23 Sheets—Sheet 5.
O. MERGENTHALER.
MACHINE FOR PRODUCING LINOTYPES, TYPE MATRICES, &c.
No. 436,532. Patented Sept. 16, 1890.
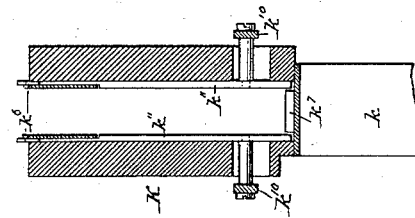
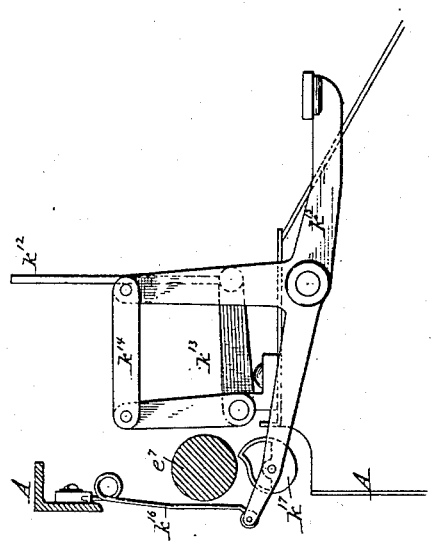
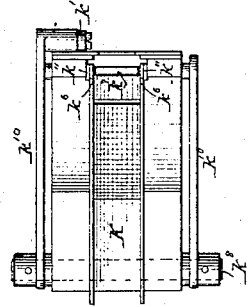
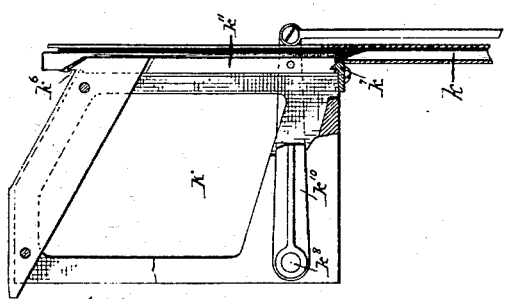

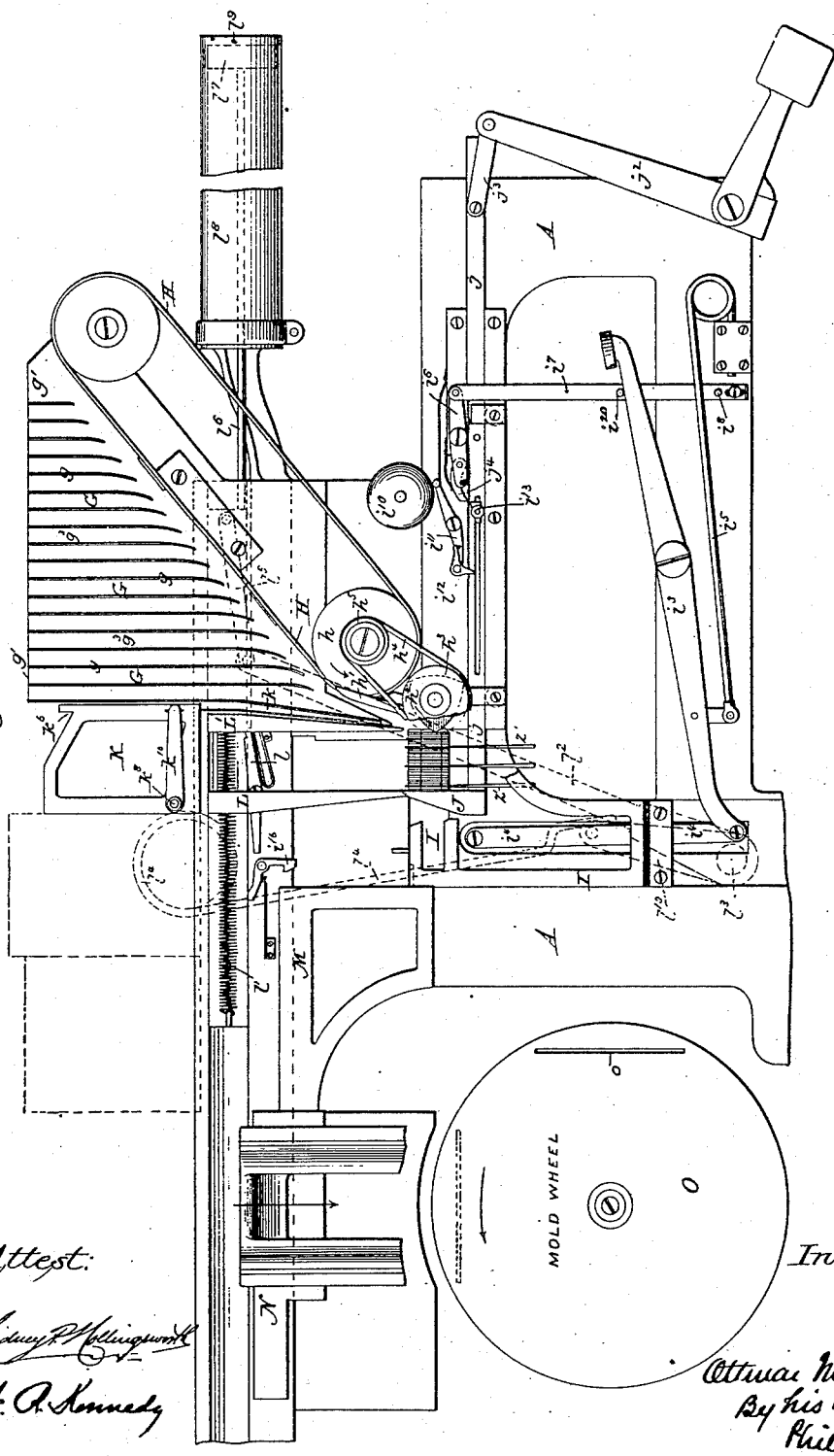

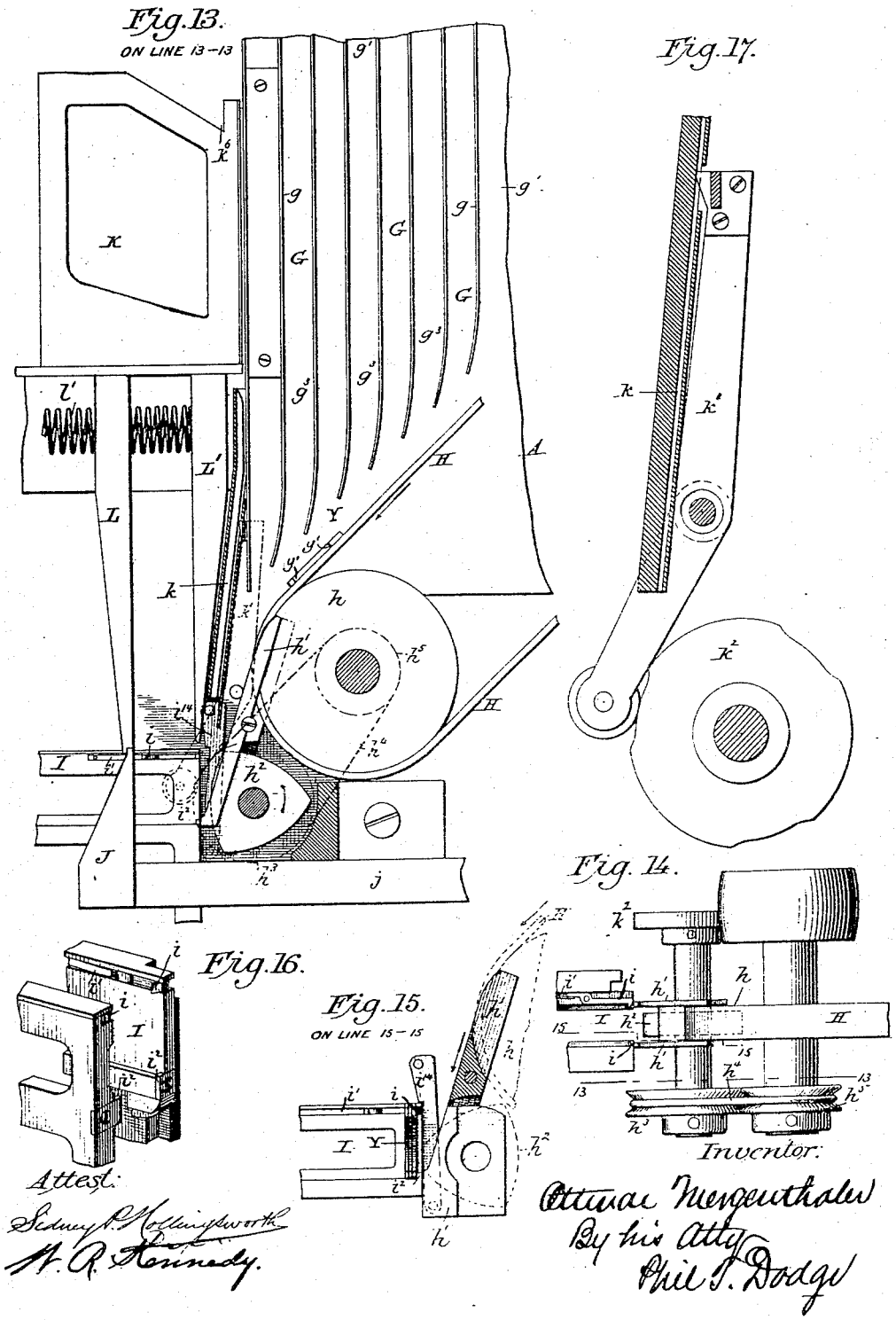

(No Model.) 23 Sheets—Sheet 8.
O. MERGENTHALER.
MACHINE FOR PRODUCING LINOTYPES, TYPE MATRICES, &c.
No. 436,532. Patented Sept. 16, 1890.
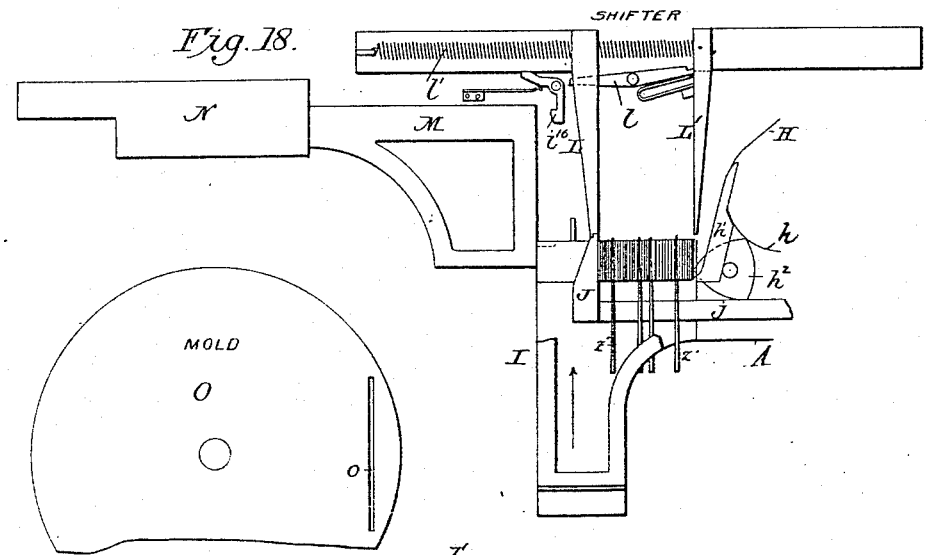
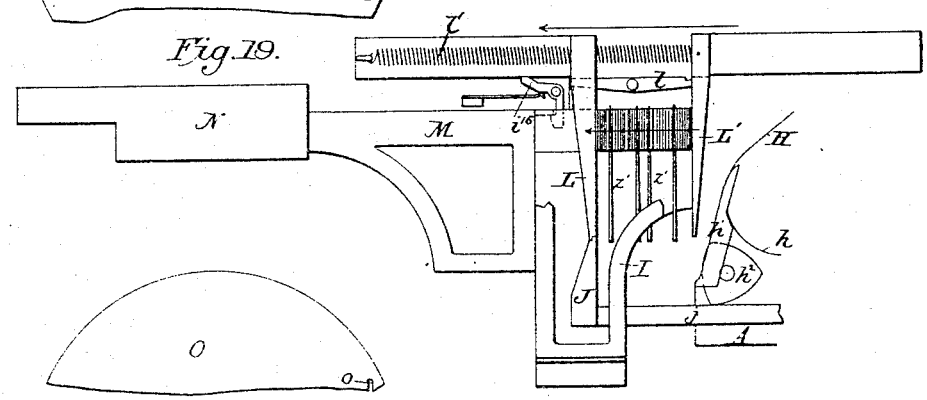
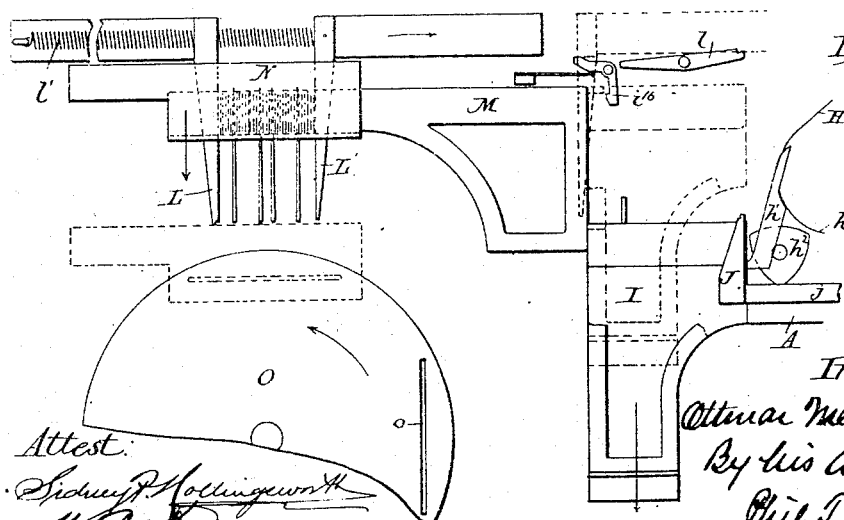
Inventor:
Ottmar Mergenthaler
By his Atty
Phil. T. Dodge
Attest:
Sidney P. Hollingsworth
W. R. Kennedy.

(No Model.)    23 Sheets—Sheet 9.
O. MERGENTHALER.
MACHINE FOR PRODUCING LINOTYPES, TYPE MATRICES, &c.
No. 436,532.    Patented Sept. 16, 1890.
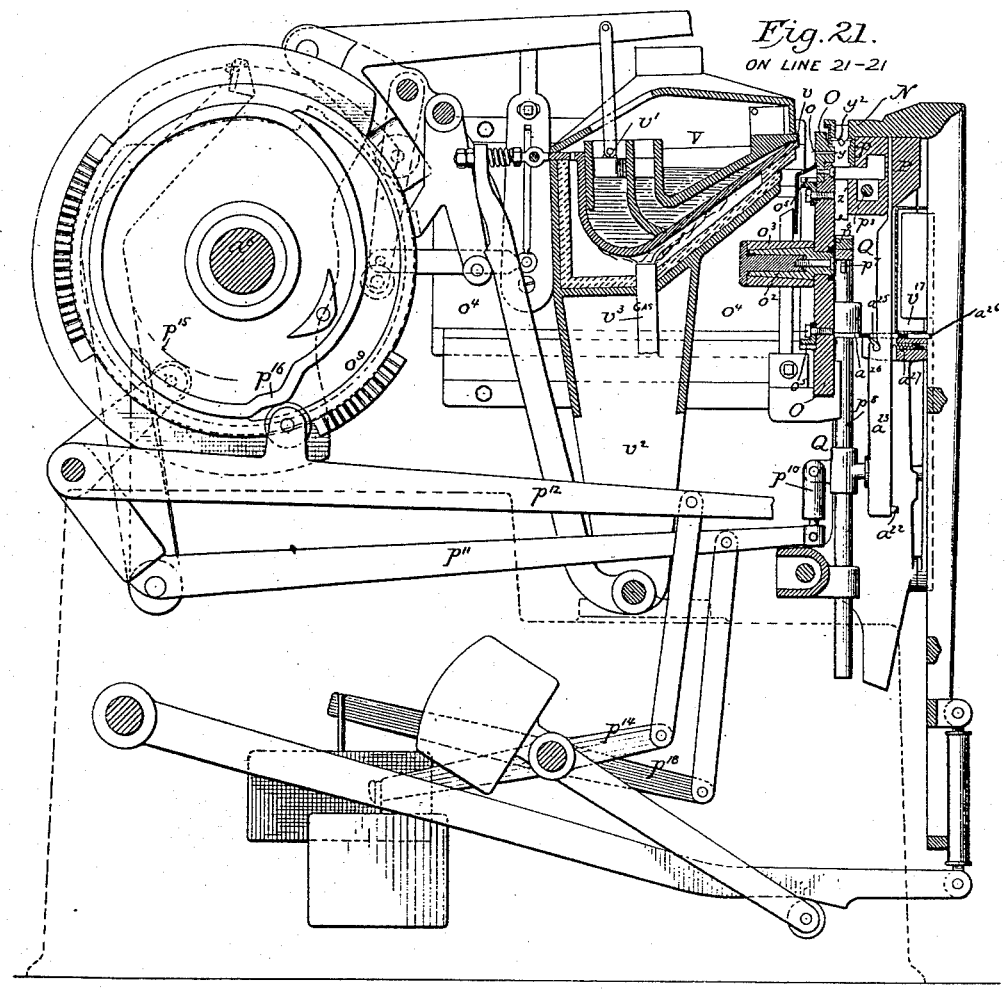
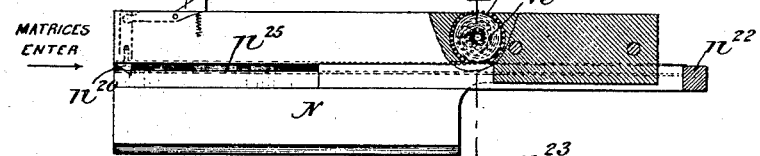
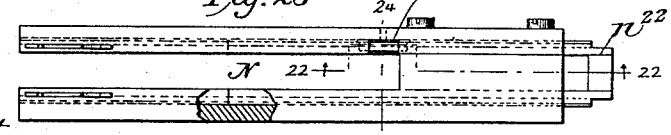
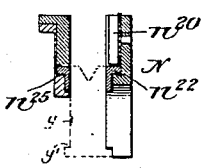
Attest:
Sidney P. Hollingsworth
N. P. Kennedy
Inventor:
Ottmar Mergenthaler
By his Atty
Phil T. Dodge (No Model.)   23 Sheets—Sheet 10.
O. MERGENTHALER.
MACHINE FOR PRODUCING LINOTYPES, TYPE MATRICES, &c.
No. 436,532.   Patented Sept. 16, 1890.
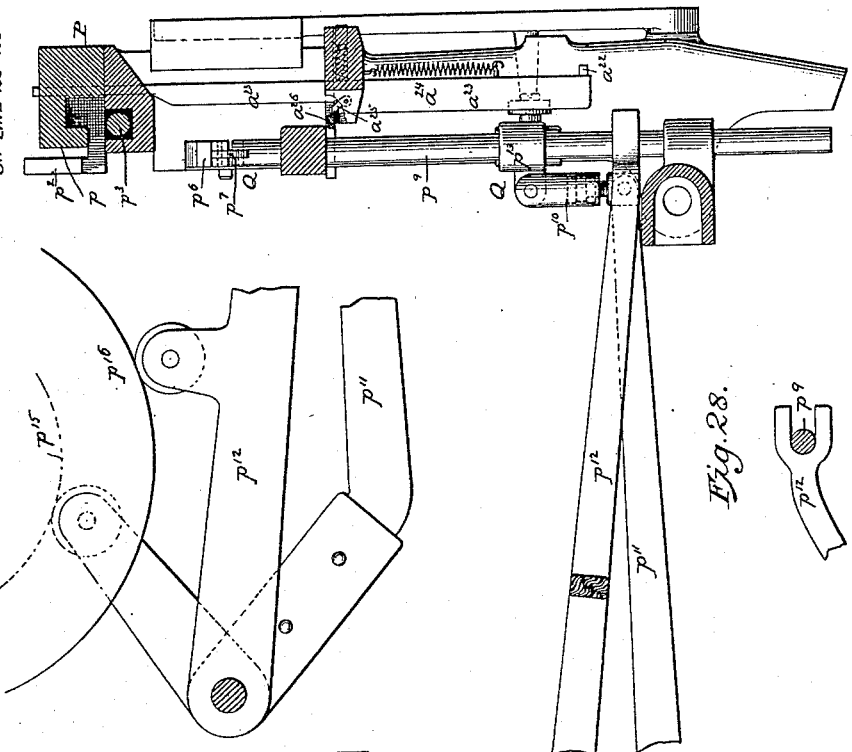
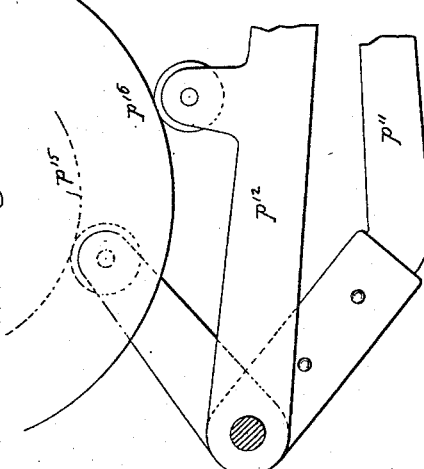
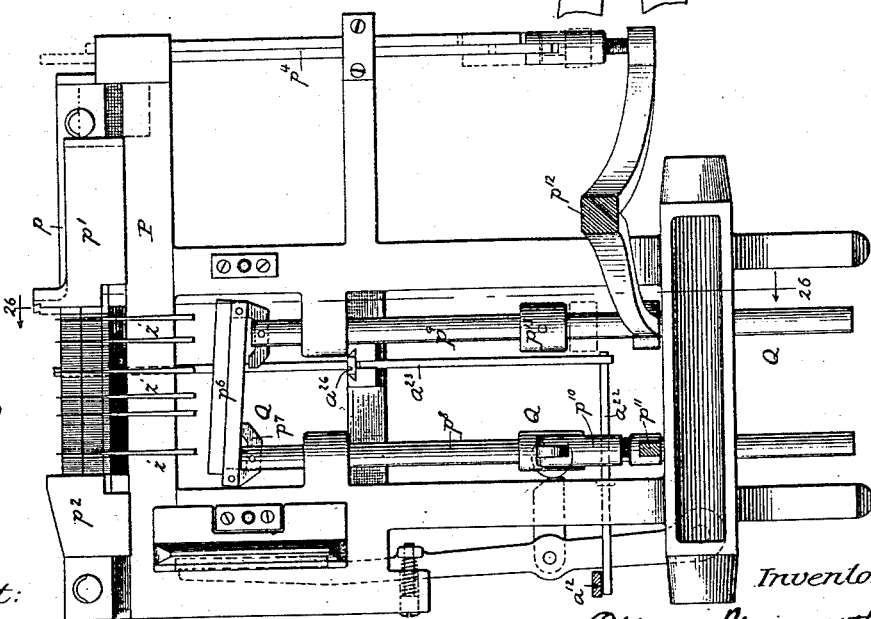
Attest:
Sidney P. Hollingworth
W. R. Kennedy.
Inventor:
Ottmar Mergenthaler
By his Atty
Phil. T. Dodge (No Model.)  23 Sheets—Sheet 11.
O. MERGENTHALER.
MACHINE FOR PRODUCING LINOTYPES, TYPE MATRICES, &c.
No. 436,532. Patented Sept. 16, 1890.
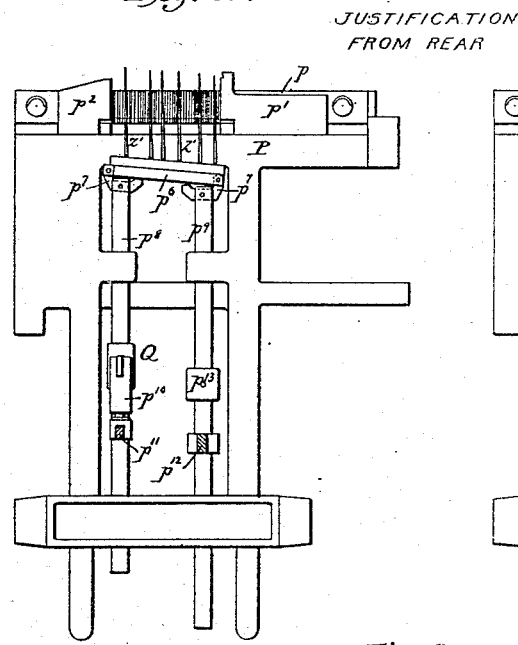
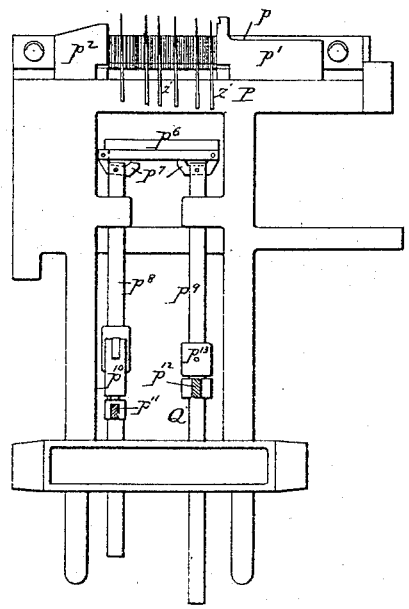
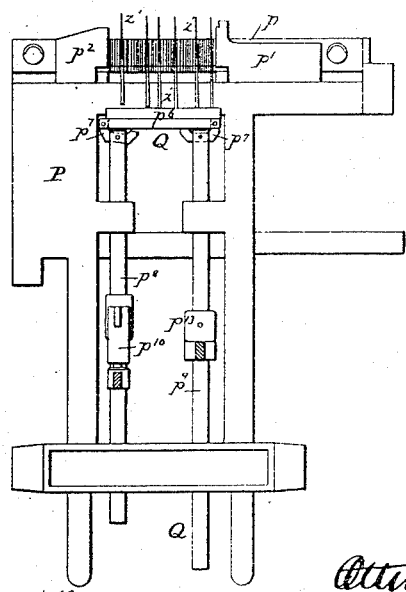

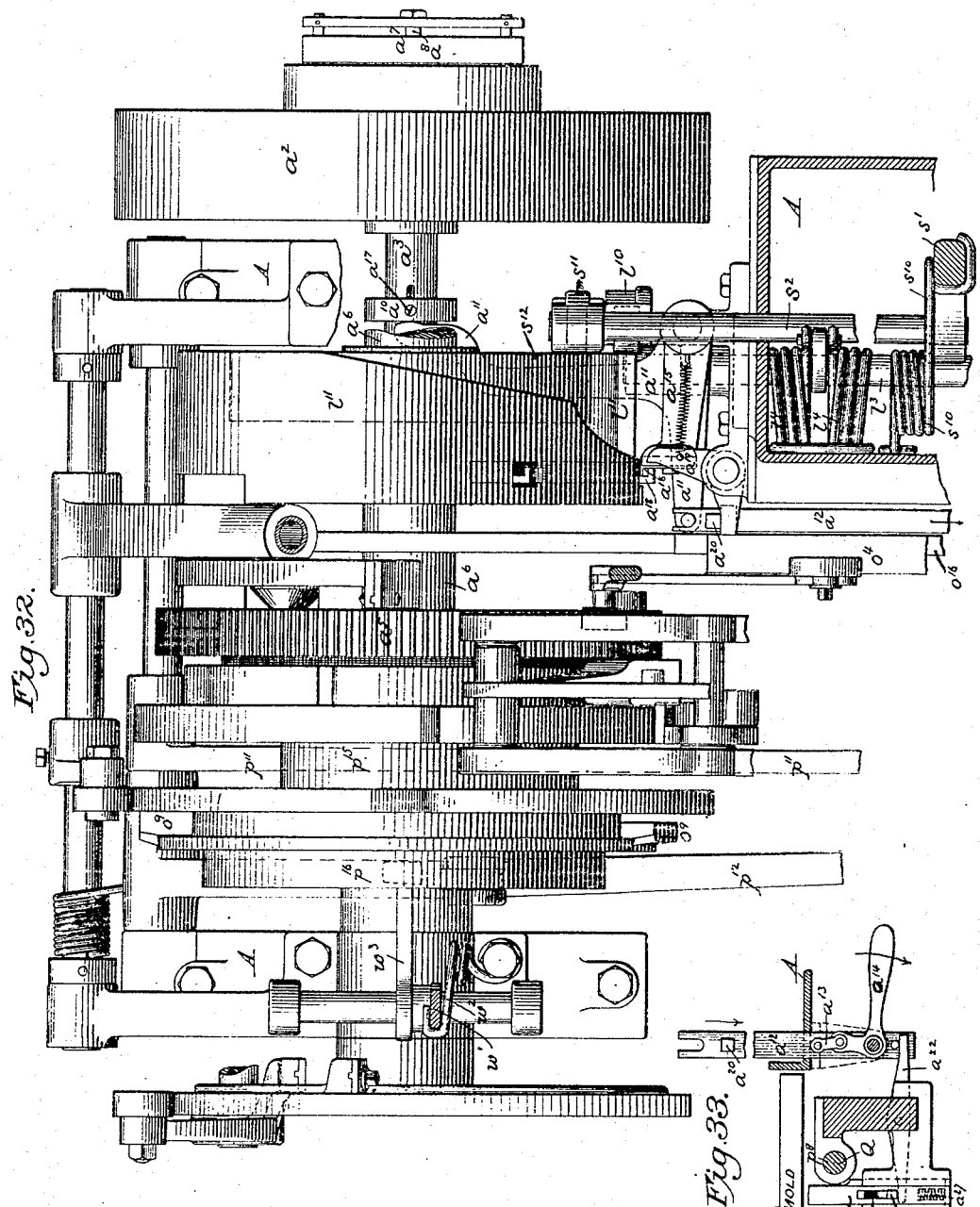

(No Model.)  23 Sheets—Sheet 13.
O. MERGENTHALER.
MACHINE FOR PRODUCING LINOTYPES, TYPE MATRICES, &c.
No. 436,532. Patented Sept. 16, 1890.
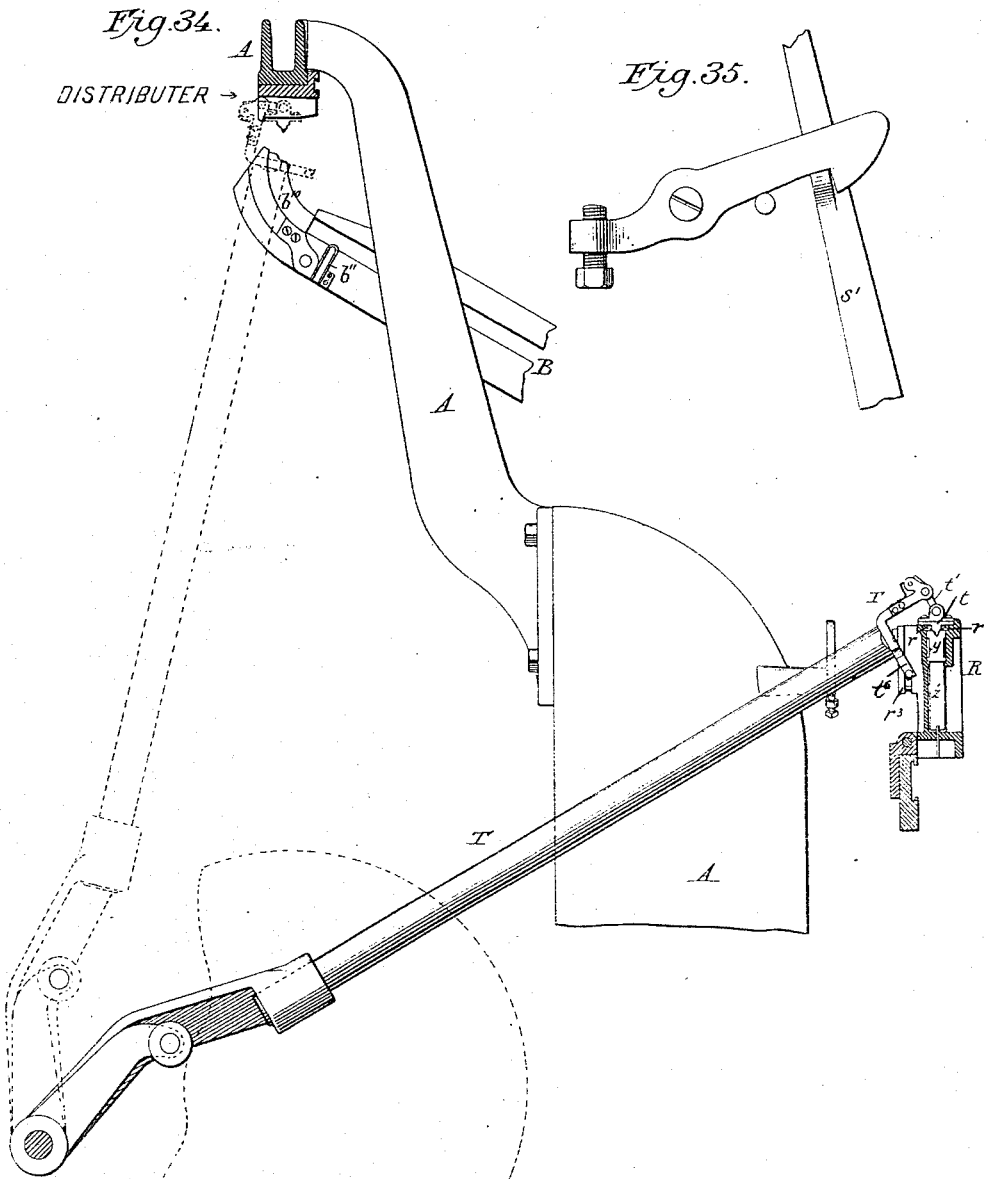
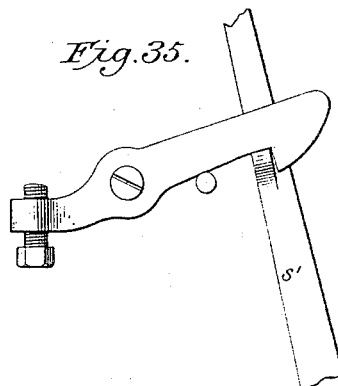

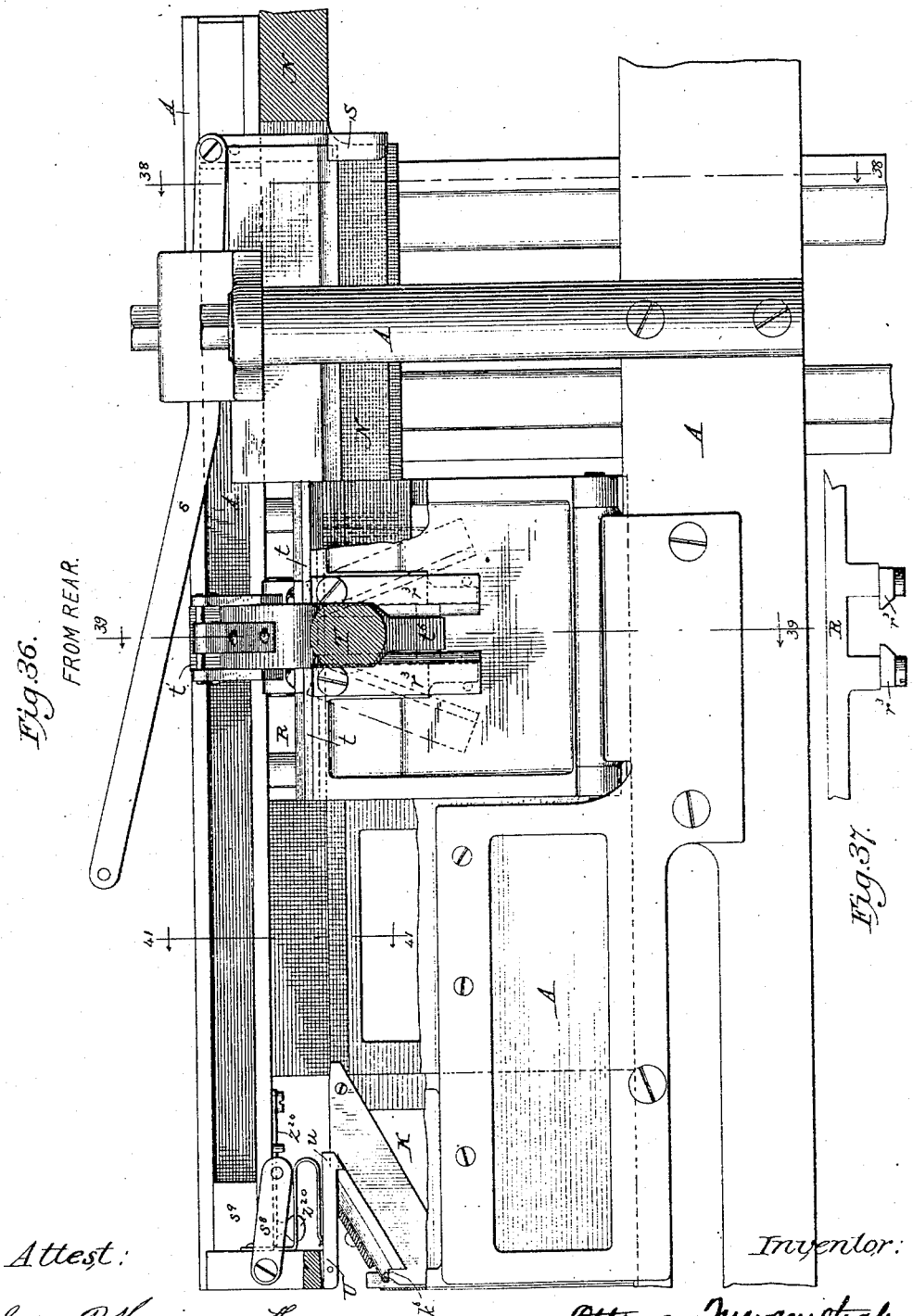

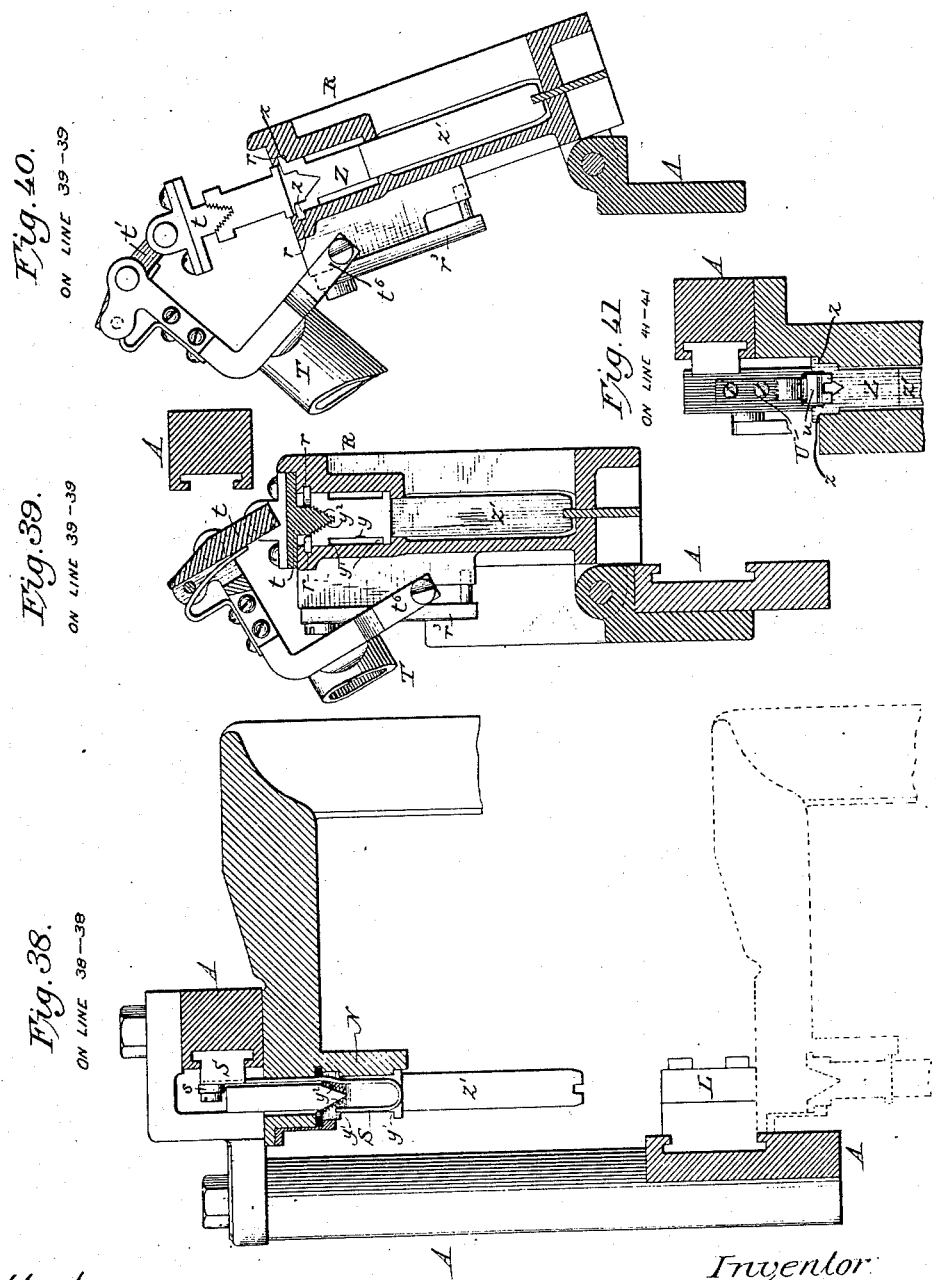

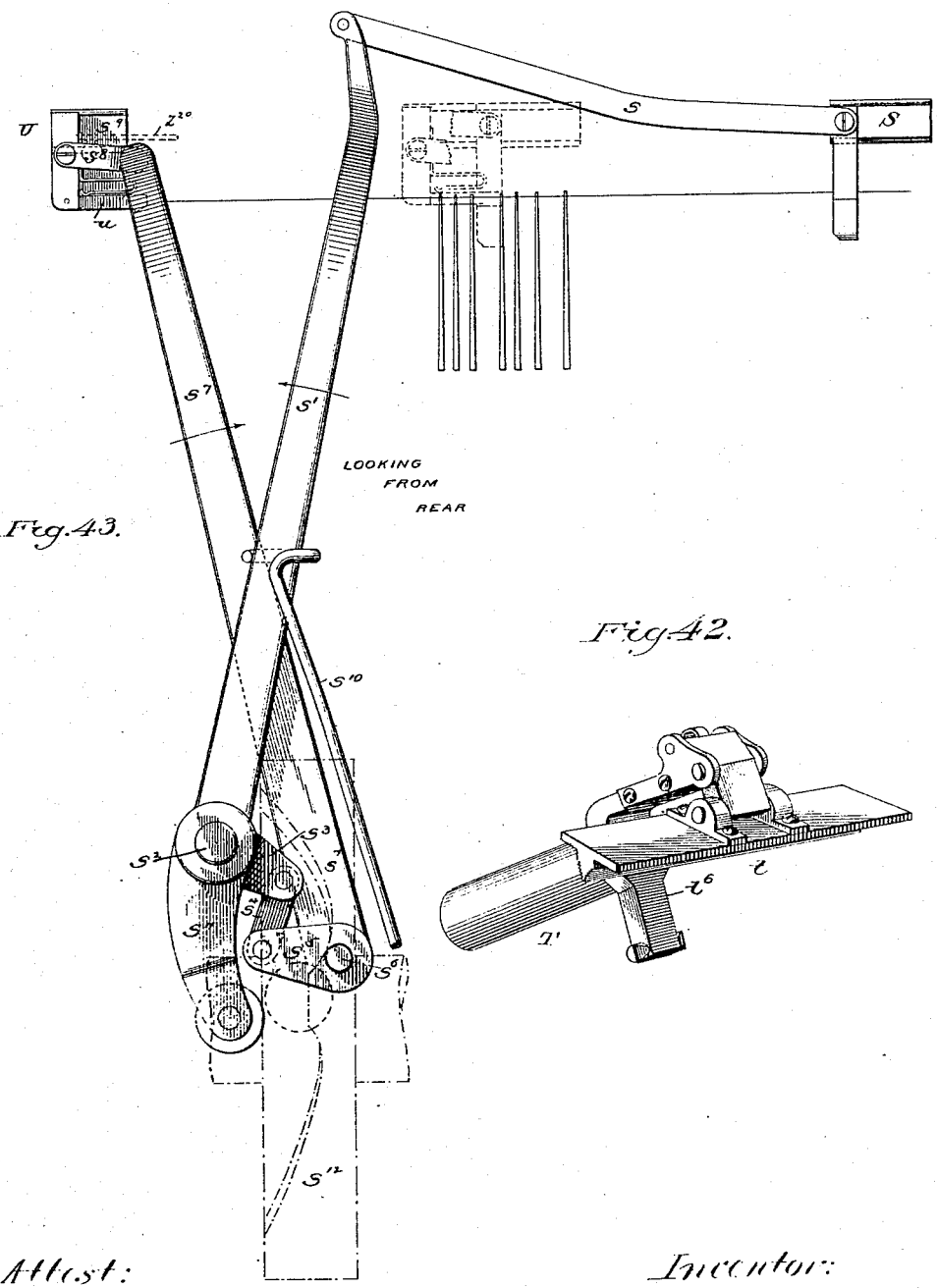

(No Model.) 23 Sheets—Sheet 17.
O. MERGENTHALER.
MACHINE FOR PRODUCING LINOTYPES, TYPE MATRICES, &c.
No. 436,532. Patented Sept. 16, 1890.
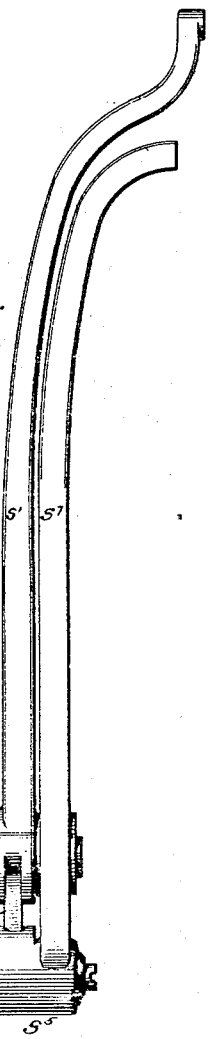
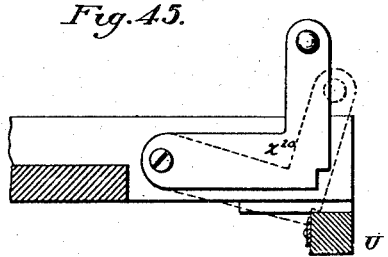
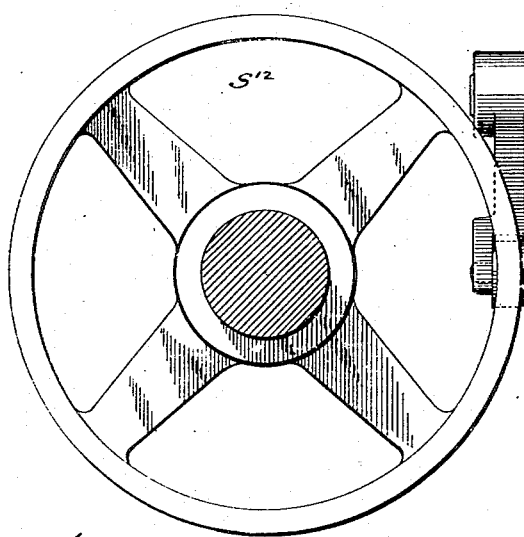
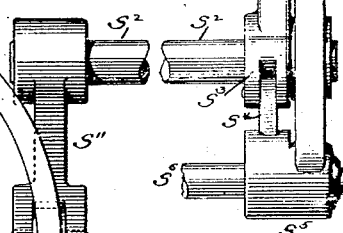

(No Model.) 23 Sheets—Sheet 18.

O. MERGENTHALER.
MACHINE FOR PRODUCING LINOTYPES, TYPE MATRICES, &c.

No. 436,532. Patented Sept. 16, 1890.

FROM REAR.

Attest:
Sidney P. Hollingsworth
H. Q. Kennedy

Inventor:
Ottmar Mergenthaler
By his atty
Phil. T. Dodge (No Model.) 23 Sheets—Sheet 19.
O. MERGENTHALER.
MACHINE FOR PRODUCING LINOTYPES, TYPE MATRICES, &c.
No. 436,532. Patented Sept. 16, 1890.
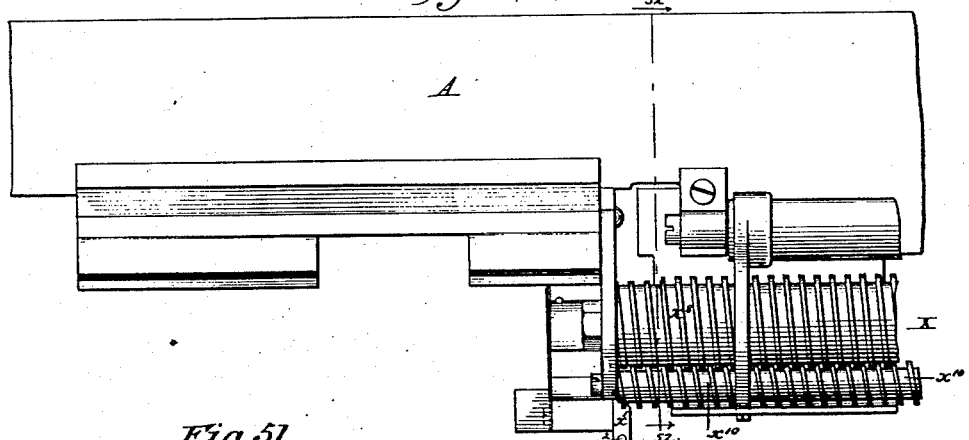
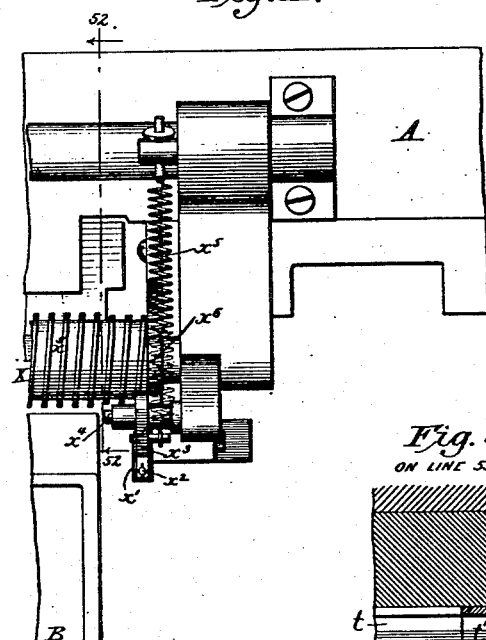
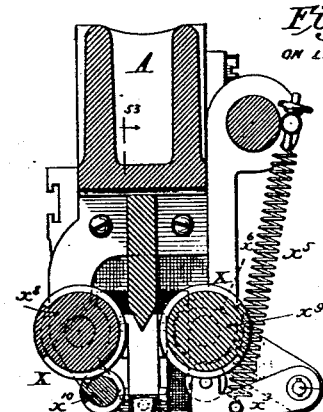
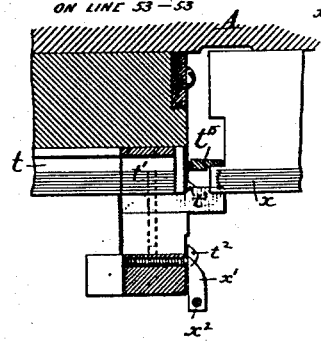
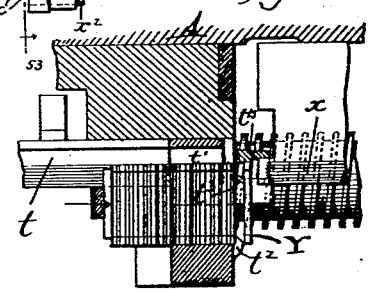
Attest:
Sidney P. Hollingsworth
H. A. Kennedy.
Inventor:
Ottmar Mergenthaler
By his Atty
Phil. T. Dodge

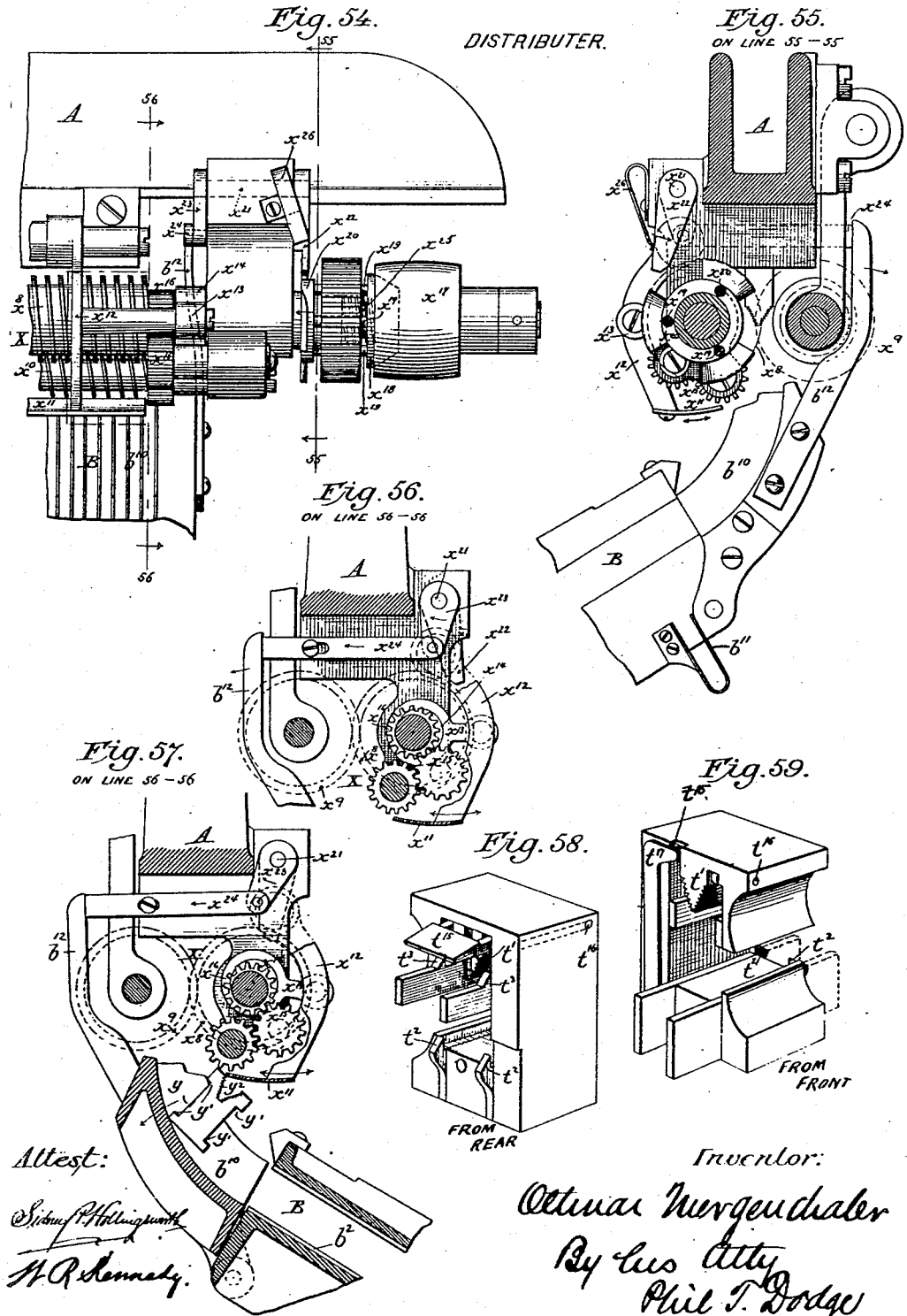

(No Model.) 23 Sheets—Sheet 21.
O. MERGENTHALER.
MACHINE FOR PRODUCING LINOTYPES, TYPE MATRICES, &c.
No. 436,532. Patented Sept. 16, 1890.
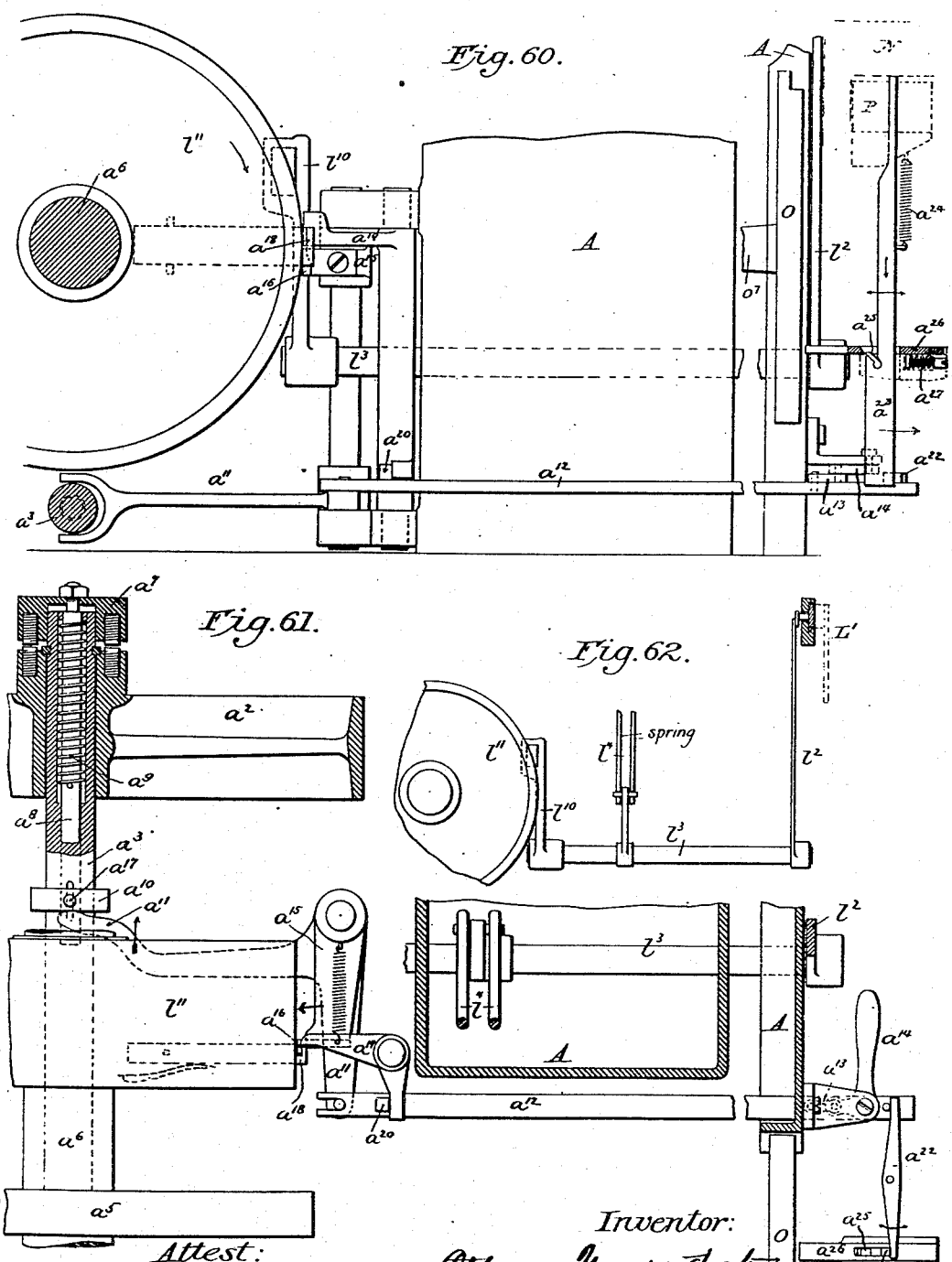

(No Model.) 23 Sheets—Sheet 22.
O. MERGENTHALER.
MACHINE FOR PRODUCING LINOTYPES, TYPE MATRICES, &c.
No. 436,532. Patented Sept. 16, 1890.
Fig. 63.
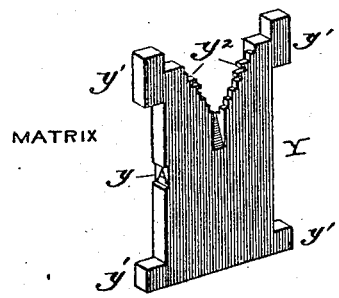
MATRIX
Fig. 64.
Fig. 65.
PRODUCT OF MACHINE
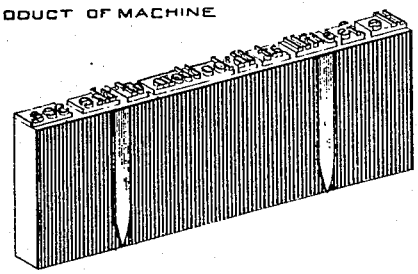
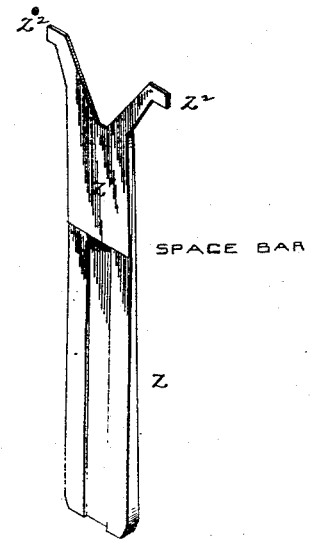
SPACE BAR
Witnesses:
Inventor:
Ottmar Mergenthaler
By Phil T. Dodge Atty

UNITED STATES PATENT OFFICE.

OTTMAR MERGENTHALER, OF BALTIMORE, MARYLAND, ASSIGNOR TO THE NATIONAL TYPOGRAPHIC COMPANY, OF WEST VIRGINIA.

MACHINE FOR PRODUCING LINOTYPES, TYPE-MATRICES, &c.

SPECIFICATION forming part of Letters Patent No. 436,532, dated September 16, 1890.

Application filed November 11, 1889. Serial No. 329,908. (No model.)

*To all whom it may concern:*

Be it known that I, OTTMAR MERGENTHALER, of Baltimore, Maryland, have invented certain Improvements in Machines for Producing Linotypes, Type-Matrices, &c., of which the following is a specification.

The present invention relates to a machine for producing what are known in the art as "linotypes"—that is to say, bars for types, each having on one edge the characters necessary to print an entire line of a page or column.

The present machine is of the same general character as those represented in numerous Letters Patent heretofore granted to me—such, for example, as Patent No. 317,828, dated May 12, 1885, and No. 378,798, dated February 28, 1888, but more particularly to that form of machine represented in my application for Letters Patent of the United States filed on the 15th day of March 1889, Serial No. 303,396.

Like its predecessors, the present machine contains as its fundamental features a series of independent female type or matrices and a series of space-bars. The matrices and space-bars properly assorted are contained in magazines or holders. A series of finger-keys representing the respective characters and the space-bars act, in connection with suitable composing mechanism, to assemble the matrices in line in the order in which they are to appear in print, and also to introduce the spaces at suitable points in the line. After the matrices and spaces for an entire line are assembled a shifting mechanism transfers them to the front of a mold, the internal form and dimensions of which correspond with those of the required linotype. While the line is thus located in front of the mold suitable clamping devices act thereon and the space-bars are advanced through the line, so as to "justify" the same. A melting-pot containing constantly a large body of molten metal is arranged to close the mold on the rear side, and at the proper moment a pump in this pot acts to deliver the molten metal into the mold, where it solidifies and produces a linotype, which receives on its edge the impression of the matrices at the front. As soon as this casting operation is completed the clamps lift the matrices from the front and the space-bars are then separated mechanically from the matrices and return to the magazine from which they started, while the matrices are carried to a distributing mechanism at the top of the machine, where they are assorted and returned to the upper ends of the appropriate magazine-tubes. After the removal of the matrices therefrom the mold makes a partial revolution and an ejecting device delivers the linotype therefrom to a galley or receiver. It will be observed that the matrices and space-bars are first assembled, then presented to the mold, and finally returned to the points from which they started, to be again used. The operations of assembling or composing one line of casting from the preceding line and of distributing a third line are carried on concurrently and independently.

The present invention relates to various improvements in the construction of the magazines; in the escapement devices for delivering the matrices from the magazine; in a finger-key mechanism and mechanical devices to continue the action of the finger-keys if they are not fully depressed by the operator; in various details of the shifting or transferring mechanism by which the assembled line is presented to the mold; in means for separating the matrices from the space-bars and transferring the matrices to the distributing mechanism, and in various details connected with the distributer.

Figure 66:
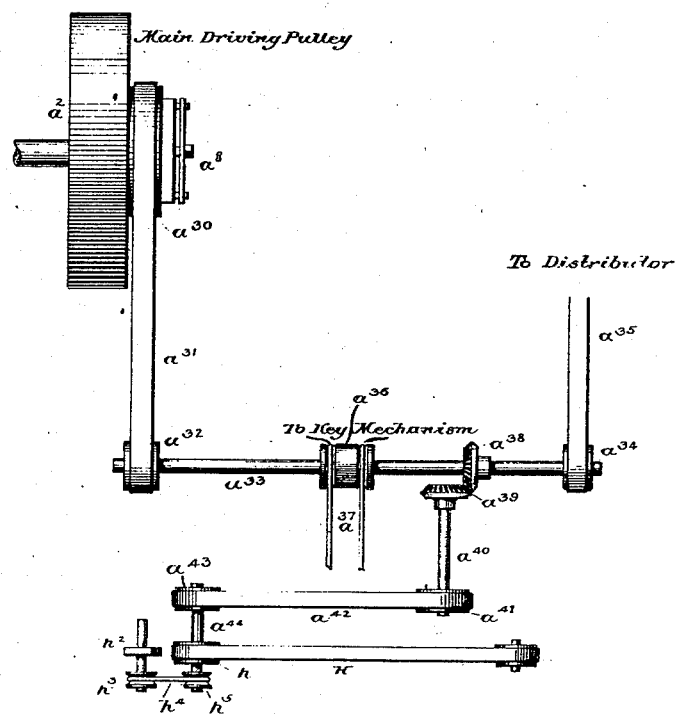

In the drawings, Figure 1 is a front elevation of my complete machine. Fig. 2 is an end elevation of the same. Fig. 3 is a vertical longitudinal section of the magazine on the line 3 3, Figs. 1, 4, and 5. Fig. 4 is a transverse section of the magazine on the line 4 4, Figs. 1, 2, and 3. Fig. 5 is a top plan view of the lower magazine-plate, showing grooves in which the matrices travel. Fig. 6 is a vertical section from front to rear through the matrix-delivering mechanism and part of the magazine on the line 6 6, Fig. 1. Fig. 7 is a horizontal section on the line 7 7 of Fig. 6, looking downward. Fig. 8 is a detail view of one of the operating-springs and its roller. Fig. 9 is a front elevation, partly in section, of the magazine and delivering mechanism for the space-bars. Fig. 10 is an end view of the same, partly in vertical section. Fig. 11 is a top plan view of the parts shown in Fig. 9. Fig. 11ª is a perspective view showing one side of the space-bar magazine and one of the fingers for delivering the space-bars. Fig. 12 is a front elevation showing the assembling and transferring mechanism and the face of the mold. Fig. 13 is a front view, partly in section, on the line 13 13 of Fig. 14, showing the details of the assembling devices. Fig. 14 is a top plan view of a portion of the same. Fig. 15 is a detail view with parts in vertical section on the line 15 15 of Fig. 14. Fig. 16 is a perspective view of the receiving ends of the assembling-block. Fig. 17 is a vertical section through a device adjacent to the front of the assembling-block to secure the proper admission of the space-bars to the line. Figs. 18, 19, and 20 are outline views showing in front elevation and in their successive positions parts for transferring the aligned matrices from the point of assemblage to the mold. Fig. 21 is a vertical section from front to rear through the lower part of the machine on the line 21 21 of Fig. 1, showing the entire casting and justifying mechanism with the line of matrices in position. Fig. 22 is a longitudinal vertical section through the vertically-moving yoke, by which the matrices are presented in front of the mold, the section being taken on the line 22 22 of Fig. 23, looking toward the front of the machine. Fig. 23 is a top plan view of the yoke shown in the preceding figure. Fig. 24 is a cross-section of the yoke, on the line 24 24 of Figs. 22 and 23. Fig. 25 is an elevation of the matrix clamping and justifying devices viewed from the rear. Fig. 26 is a vertical section of the same from front to rear, on the line 26 26 of Fig. 25. Fig. 27 is a detail view showing a portion of the cams and levers for operating the justifying devices. Fig. 28 is a top plan view of one arm of the justifying-lever. Figs. 29, 30, and 31 are rear elevations of the clamping and justifying devices, with the line of matrices and space-bars in position, showing the successive positions of the various parts during the justifying operation. Fig. 32 is a top plan view of the driving mechanism of the machine, showing the various cams, driving-clutches, starting-levers, &c. Fig. 33 is a top plan view showing in detail means for starting the machine automatically and at will. Fig. 34 is a view showing in side elevation mechanism for lifting the line of matrices to the distributer. Fig. 35 is a view of details pertaining to said arm. Fig. 36 is a rear elevation showing principally the mechanism for separating the space-bars from the line of matrices after the casting operation. Fig. 37 is a plan view of certain parts shown in the preceding figure. Fig. 38 is a cross-section on the line 38 38 of Figs. 1 and 36. Figs. 39 and 40 are vertical cross-sections on the line 39 39, Figs. 1 and 36, showing the matrix-elevator and parts in the successive positions which they occupy during the separation of the matrices from the space-bars. Fig. 41 is a cross-section on the line 41 41, Figs. 1 and 36. Fig. 42 is a perspective view of the matrix-elevator. Fig. 43 is a rear elevation of the parts by which the matrices and space-bars are presented to the separating devices and the space-bars transferred to their holder or magazine. Fig. 44 is a side view of certain parts of the operating devices shown in the preceding figure. Fig. 45 is a stop device used when linotypes are to be produced in duplicate from the same line of matrices. Figs. 46, 47, 48, and 49 are diagrams illustrating the action of the mechanism shown in Figs. 42 to 44 for separating the matrices from the space-bars. Fig. 50 is a front elevation of the receiving end of the distributing mechanism. Fig. 51 is a rear elevation of the same. Fig. 52 is a cross-section on the line 52 52 of Figs. 1, 50, and 51. Fig. 53 is a longitudinal vertical section of the distributer on the line 53 53, Fig. 52. Fig. 53ª is a similar view showing the distributer with a line of matrices entering the same. Fig. 54 is a front elevation of the rear or delivery end of the distributing mechanism, showing particularly the driving mechanism and automatic stop devices. Fig. 55 is a cross-section on the line 55 55, Figs. 1 and 54. Fig. 56 is a vertical cross-section on the line 56 56 of Fig. 54, looking in the direction indicated by the arrow, with the parts in their normal or operative position. Fig. 57 is a similar view, looking toward the mouth of the magazine, with the parts thrown out of action by the lodgment of a matrix therein. Figs. 58 and 59 are perspective views, looking, respectively, from the rear and from the front, of the devices which sustain the matrices immediately before their delivery to the distributing-rail. Fig. 60 is a side elevation of the main driving-clutch and connections through which the motion of the machine is controlled. Fig. 61 is a top plan view showing the same portions in horizontal section. Fig. 62 is a side elevation showing the cam and lever connections for operating the matrix shifting or transferring devices. Fig. 63 is a perspective view of one of the matrices employed in the machine. Fig. 64 is a perspective view of one of the space-bars. Fig. 65 is a perspective view of one of the linotypes the product of the machine. Fig. 66 is a diagram illustrating the connections for constantly driving the key mechanism and distributer.

*General organization.*—A represents a rigid main frame, which may be of any form or construction adapted to sustain the operative parts herein described.

B is the magazine in which the assorted matrices are contained.

D are finger-keys representing the respective letters or characters, and connected by rods E with the escapement mechanism located in the mouth of the magazine to deliver the matrices one at a time therefrom.

G G are a series of upright slots or channels through which the matrices descend.

H is an inclined traveling belt on which the matrices are received and by which they are delivered to the vertically-movable assembling-block I, against a yielding resistant J.

K is a reservoir or receptacle in which the space-bars are held, and from which they are dropped, one at a time, into the assembling-block I.

L L' are transferring or shifting arms, which carry the matrices from the elevated assembling-block through a stationary guide-block M to a vertically-movable yoke N, by which they are first lowered to the vertical mold-wheel O, and thereafter lifted within reach of the assorting devices.

P is the "vise," so called, a frame supporting the matrix-clamps and sliding mechanism Q operating the space-bars.

R are stationary rails or supports to receive the line of matrices and space-bars.

S is a slide to transfer said line to said rails from the yoke N after the latter is elevated.

T is a vertically-swinging arm provided with means for lifting the matrices from the rail R to the distributer, leaving the space-bars behind.

U is a device for carrying the space-bars from the rails into their receptacle or magazine K.

W is a slide at the top of the machine to carry the matrices from the lifting device T into the distributer X, whence they return to the magazine.

*Matrices.*—The matrices employed in the machine are preferably identical in construction with those described in my application, Serial No. 303,396. As shown in Fig. 63, each matrix Y consists of a flat rectangular plate of brass or like material provided in one edge with the intaglio letter or matrix proper $y$, and recessed in its two vertical edges to produce the four shoulders $y'$. The matrix is also notched centrally in its upper edge and provided with sustaining-teeth $y^2$, the number and arrangement of which differ on matrices bearing different characters, so that they may be employed as a means of distinguishing between and distributing the matrices in the manner set out at length in Letters Patent No. 347,629, granted to me on the 17th day of August, 1886.

*Space-bars.*—The space-bars or justifying devices are of the same character as those described in numerous patents heretofore granted to me, and shown in Fig. 64. Each bar consists of a long wedge Z, carrying on one side a second wedge $z'$, provided at the upper end with suspending-shoulders $z^2$, tapered in the opposite direction and connected thereto by a dovetail or other sliding joint.

*The matrix-magazine.*—The magazine B, to contain the matrices, (hereinafter designated as the "magazine,") consists simply of two inclined plates $b$ and $b'$, one overlying the other, their approximate faces being provided with grooves $b^2$ and secured at such distance apart that the matrices may lie on edge between them, the edges of the matrices being received in the grooves of the respective plates, as clearly shown in Figs. 3 and 4. It will be observed that under this arrangement the matrices are held end to end in rows or lines and permitted to slide freely downward between the plates, those in one line being kept out of contact with the adjacent lines. The construction is advantagous because of its extreme simplicity, because it permits access to the matrices from the side, and because the matrices are exposed to slight frictional contact and permitted to advance without retardation by confined air, as is the case when closed magazine-tubes are employed. The grooved plates are ribbed or otherwise stiffened on the back or secured to a suitable frame to keep them in position, and they are held a suitable distance apart by means of supporting-posts $b^3$ at the sides, or by any other suitable connections. The magazine as a whole is mounted at such inclination that the matrices will descend therefrom with certainty and rapidity, reliance being placed in the present machine wholly upon gravity to effect the discharge of the matrices when released. I prefer to mount the magazine as a whole so that it may be instantly removed from the machine. I commonly provide the magazine on the under side with retaining-shoulders $b^4$, and seat the same on a transverse rod $b^5$, fixed in the main frame. This gives sufficient support to the upper end of the magazine. At the lower end it rests upon adjustable screws $b^6$, seated in the main frame, serving as a means of raising and lowering the mouth of the magazine to secure its exact adjustment. In order to facilitate the entrance of the matrices, the grooves are expanded horizontally at their receiving ends, as shown at $b^7$, Fig. 5. At their lower ends the grooves are brought as closely together as possible; but they diverge toward their receiving ends, as shown in Fig. 5, in order that the widened mouths may be employed and to insure the proper admission of matrices from the distributer.

*The matrix-delivering mechanism.*—At the lower end of the magazine I provide each channel of the bottom plate with an escapement F, allowing the discharge of a single matrix at a time. This escapement (shown in detail in Fig. 6) is practically identical with that in my application, Serial No. 303,396, and consists of a centrally-pivoted lever $f$, sustaining at its opposite end the upright pins $f'$ and $f^2$, which rise alternately into the magazine, so that when the pin $f'$ descends to release the foremost matrix in the line the other will rise to arrest the advance of the next matrix. A strong spring $f^3$ acts constantly on the rear end of the escapement-lever and holds the same normally in the position shown in Fig. 6. The rear end of the lever is formed with a depending hook $f^4$, to received the hooked end of the operating-rod E, which is held in engagement therewith by a spiral spring $e$, attached at one end to the rod and at the other end to the main frame. This hooked connection permits the escapement-levers to be lifted with the magazine out of the machine, leaving the operating-rods behind. It also maintains a close connection between the parts when in operative position and causes a connection to be automatically re-established when the magazine is reapplied to the machine. Each of the rods E is extended downward through suitable guides, and provided at the lower end with a shoulder $e'$, resting on the rear end of a finger-key D, which latter is mounted midway of its length on a fixed pivot $d$, so that when the front end of the finger-key is depressed its rear end elevates the rod and actuates the escapement, causing a single matrix to be delivered from the magazine. In order to prevent crowding of the parts, the rods E have their lower ends thrown alternately to the right and left—that is to say, forward and backward—so that they stand in two ranks, as seen in Figs. 6 and 7.

In practice it is found that operators, particularly those who operate rapidly, are liable to release the finger-keys before they are fully depressed, and that consequently there will be a failure to deliver a matrix. I have therefore provided mechanism for continuing the movement of the key and escapement devices whenever the key is but partially depressed by the operator. In the form shown this mechanism consists, as in Figs. 6, 7, and 8, of a spring-arm $e^2$, fixed to the frame adjacent to each rod E, the arm being provided at its free end with a roller $e^3$, acting against a V-shaped projection $e^4$ on the rod. When the rod is in its normal or lower position, the roller bears above the projection $e^4$, as shown on the right hand in Fig. 6. As the rod rises, however, under the influence of the finger-key, the projection is carried upward past the roller, and the instant that this point is above the center of the roller the latter rides beneath the projection, under the influence of the spring, as shown on the left hand in Fig. 6, and continues the upward movement of the rod and insures the delivery of a matrix, although the finger-key may have been released prematurely. The roller and spring will retain the rod in its elevated position, and thus give ample time for the escape of the released matrix before the escapement returns to its original position. As the roller and spring will uphold the rod permanently in its elevated position, it is necessary to provide means for depressing the same after a short interval of time. For this purpose I provide each of the rods with a rigid projecting arm $e^5$, carrying a vertical eccentric $e^6$. Across each rank or row of rods I mount a horizontal roller $e^7$, sustained in bearings on the frame and constantly rotating. Whenever a rod is lifted to discharge a matrix, its eccentric $e^6$ is brought in contact with the roller and is frictionally revolved thereby.

As the eccentric is thus rotated it is forced bodily downward by reason of its shape and carries with it the rod E. The normal position of the rod and eccentric is shown on the right hand in Fig. 6, while the action of the eccentric and depressing-rod is shown on the left hand in the same figure.

From the foregoing it will be understood that the escapement is positively actuated whenever the operator partly depresses a finger-key, and that after being operated the parts are automatically returned to their normal position.

I believe myself to be the first to combine with a matrix or type-discharging mechanism a finger-key and a positively-acting device to operate the discharging or releasing mechanism brought into action by a partial movement of the finger-key, and this I claim broadly in any form the mechanical equivalent of that herein shown.

In order to reduce the friction of the moving parts, I mount between the two ranks of rods E, on a single shaft, a series of loose rollers $e^8$, bearing one against each of the rods, as shown in Figs. 6 and 7.

*Assembling mechanism.*—The assembling and transferring mechanism of the present machine are of the same general character as those described and claimed in application, Serial No. 303,396, but differ therefrom in various minor features, which will be hereinafter pointed out. On being discharged from the magazine the matrices descend vertically to the vertical channels or guides $g^3$, consisting simply of ribs $g$, applied to a vertical back plate $g'$, and covered at the front by a hinged glass plate $g^2$, Fig. 1, which affords a constant view of the interior and permits convenient access. The lower ends of the ribs $g$ are deflected slightly to the left, as in the former machine, and terminate near the belt H, in order that the matrices may be presented flatwise and with the proper end foremost upon the belt. The belt instead of being carried around an angular pulley at the lower end is now supported on a circular pulley $h$, at a slight distance above the assembling-block. Passing from the belt, they descend on an inclined fixed plate $h'$, which straddles the belt and directs them downward into the open end of the assembling-block. (Plainly shown in Figs. 12, 14, 15, and 16.) Directly opposite the open end of the assembling-block is mounted a rotary wheel $h^2$, of triangular or other polygonal form, receiving a constant rotary motion through a pulley $h^3$ and belt $h^4$ from the pulley $h^5$ on the shaft of the pulley $h$. The angular pulley $h^2$ operates through a slot in the lower end of the guide-plate $h'$ and serves to force the descending matrices forward, one after another, into the assembling-block, where they stand in vertical positions side by side, as shown in Fig. 12. The space-bars suspended in their reservoir K are delivered one at a time therefrom, and descend through a conductor $k$ to the front of the assembling-block, into which they are carried in the same manner as the matrices and added to the line in course of composition or assemblage. As the space-bars have but a short distance to fall, there is danger that a bar may arrive at the assembling-block before or at the same time with a matrix previously released from the magazine. To avoid the possibility of this occurrence, a stop-lever $k'$, Figs. 13 and 17, is pivoted adjacent to the conductor $k$, its lower end acted upon, as shown in Fig. 17, by cam $k^2$, and its upper end arranged to enter the conductor $k$. The cam is so shaped and timed that the lever permits the descent of the space-bars during certain intervals only, these intervals being sufficiently separated to insure the delivery of a matrix in the meanwhile from the most distant part of the magazine to the assembling-block.

In order to prevent the matrices from rebounding and escaping from the assembling-block I, it is provided, as shown in Figs. 13, 14, and 16, at the top with beveled hooks or latches $i$, actuated by springs $i'$, and serving to engage the upper ends of the matrices as they enter the block. The block is also provided with stationary shoulders $i^2$, to engage and retain the lower ends of the matrices, which are carried inward over the shoulders by the guide-plate $h'$.

In order to insure the assembling of the matrices in compact line and to prevent them from being carried forward by their momentum through the assembling-block, I provide a yielding resistant J, Fig. 12, consisting of an upright finger on the end of a horizontal sliding bar $j$, which is guided in the main frame and urged constantly to the right by means of a weighted lever $j^2$, pivoted to the main frame and connected to the bar by link $j^3$, as shown in Figs. 1 and 12. As the resistant is forced forward step by step through the action of the rotary wheel $h^2$ and the intervening matrices, it is detained by a pawl $j^4$, pivoted to the frame and engaging teeth on the sliding bar, as shown in Figs. 1 and 12. It is to be understood that the resistant J is free to move forward through the assembling-block before the accumulating line of matrices, and that the assembling-block is slotted vertically in such manner that it may rise freely and carry the assembled line upward away from the resistant, from the level at which they were assembled to the level of the stationary guide M. The vertical movement of the assembling-block is effected by a hand-lever $i^3$, pivoted to the main frame and connected by a link $i^4$ to the block, as shown particularly in Figs. 1 and 12. A spring $i^5$ acts on the lever $i^3$ to insure the descent of the assembling-block. A small lever $i^6$, pivoted to the frame, engages the dog $j^4$ at one end, and at the opposite end is connected to a vertical bar $i^7$, having a pin $i^8$, in the path of the descending lever $i^3$, so that when the lever is operated to elevate the assembling-block and lift the matrices the dog $j^4$ is disengaged and the resistant J permitted to return to its original position at the right preparatory to the assemblage of a new line after the assembling block descends.

For the purpose of transferring the assembled line from the elevated assembling-block across the guide M to the vertically-movable yoke N (see particularly Figs. 18 to 20) I employ, as in the previous machine, a horizontally-movable "shifter," so called, consisting of the vertical arms L L', carried by independent slides guided in the main frame, so that the arms may move from right to left. A latch $l$ pivoted to the frame holds the arm L' normally at the right of the assembling-block, and a spring $l'$ urges the arm L constantly toward arm L'. The lower end of arm L is arranged to engage the upper end of the resistant J, as shown in the several figures, so that as the accumulating line forces the resistant forward to the left the latter carries with it the arm L, thus increasing the distance between the arms L L' to correspond with the length of the line of matrices, so that the latter may be lifted by the assembling-block between said arms from the original position shown in Fig. 18 to the elevated position shown in Fig. 19. After the line is thus placed within the grasp of the shifter-arms they are both moved to the left, carrying the line between them out of the assembling-block and through the guide M into yoke N. This forward movement of the shifter is secured, as shown in Figs. 12, 32, 61, and 62, by an upright lever $l^2$, mounted on a fore-and-aft shaft $l^3$ in the main-frame, urged constantly to the left by a spring $l^4$, and connected at its upper end to the slide of arm L' by a link $l^5$. A second pin $i^{20}$ is secured to bar $i^7$ above lever $i^8$, so that when the latter rises to its normal position it insures the lifting of bar $i^8$ and the lowering of lever $i^6$, so that dog $j^4$ may re-engage bar $j$. When the latch $l$ is released by the action of the rising assembling-block thereon, the spring $l^4$ acts through the intermediate parts and immediately carries the shifter to the left. The speed at which the shifter advances is controlled by a piston-rod $l^6$, connected to the shifter and provided with a piston $l^7$, traveling in a stationary cylinder $l^8$, the cylinder being provided with a restricted opening $l^9$, for the admission of air, or with equivalent means through which the admission of air may be limited. After the shifter is moved to the left, as stated, it is returned to its normal position by an arm $l^{10}$, keyed to the rock-shaft $l^3$, and bearing, as shown in Fig. 61, against a cam-face on the side of the vertical wheel $l^{11}$.

In order to attract the operator's attention when the assemblage of a line in the block I is nearly completed, a bell $i^{10}$ is mounted on the main frame adjacent to a pivoted striker $i^{11}$. A lever $i^{12}$ is also mounted on the frame with one end in position to operate the striker and the other in position to encounter the stud $i^{13}$, adjustably secured in a horizontal slot in the bar of the resistant, so that it may be fixed in position to sound the alarm whenever the line reaches a predetermined length.

In order to prevent the possibility of the assembling-block being lifted with the line of matrices before the shifter has returned to the proper position to receive the line, I pivot to the main frame, as shown in Figs. 13 and 15, a latch $i^{14}$, to engage over the corner of the block I to hold it down, as seen in Fig. 15. When the shifter-arm L' returns to its normal position at the right, it encounters this latch and disengages the same from the block.

In order to prevent the assembling-block I from descending before the entire line of matrices is shifted therefrom, I pivot to the frame a spring-actuated dog $i^{16}$, Fig. 19, adapted to automatically engage the assembling-block and hold the same in its elevated position. As the shifter-arm L moves forward past the assembling-block I, it encounters the dog $i^{16}$, as shown in dotted lines in Fig. 20, and disengages the same from the assembling-block, which descends automatically to its original position to receive matrices for the next line. When the line of matrices is transferred into the yoke L, it must be held together in close order therein, or, in other words, the matrices must be prevented from separating. This is accomplished as shown in Figs. 22, 23, and 24. In considering Figs. 22 and 23, it must be borne in mind that they show the yoke in a reverse position—that is to say, viewed from the rear—the right-hand side of the yoke as seen from the front of the machine being on the left hand in the figures. The yoke is provided at its receiving end, at each side of the matrix-receiving slot, with a vertically-sliding latch $n^{20}$, the lower end of which is beveled to override and engage behind the shoulders on the top of the matrices to prevent them from rocking and escaping from the yoke. Each of these latches $n^{20}$ is jointed at its top to a pivoted spring-actuated lever $n^{21}$, projecting at one end above the yoke. As the matrix-line advances into the yoke its forward end encounters the ends of a horizontal U-shaped receiving-slide $n^{22}$, the arms of which are mounted in grooves $n^{25}$ in the inner walls or faces of the yoke. One of the arms of this slide is toothed in its upper edge, or, in other words, made in the form of a rack-bar, and engages a toothed wheel $n^{23}$, mounted in the yoke and containing a coiled spring $n^{24}$, after the manner of a watch-barrel. This spring-actuated wheel urges the slide constantly toward the receiving-side—that is to say, the right-hand side of the yoke—so that although the slide yields and moves backward to the left before the increasing line of matrices it presses them toward the latches $n^{20}$ at the opposite side, and thus holds them closely or compactly together. When the yoke rises to the level of the guide R, the levers $n^{21}$ encounter an overlying portion $n^{26}$, Fig. 2, of the frame, and are thereby caused to raise the latches $n^{20}$, releasing the line of matrices, so that they may be carried to the right out of the yoke.

*Space-bar delivery.*—The receptacle K, Fig. 9, which contains the space-bars, is vertically slotted so that they hang in a pendent position therein, suspended by their shoulders on the upper inclined edges of the receptacle, as in my previous machine, so that they descend by gravity toward one side of the receptacle against detaining-shoulders $k^6$ at its top and the shoulders $k^7$ at its bottom. A rock-shaft $k^8$, through the base of the receptacle, carries two arms $k^{10}$, which in turn support vertically-moving slides $k^{11}$, Figs. 11 and 11$^a$, acting beneath the shoulders of the front bar to lift the same above the shoulders $k^6$ $k^7$, so that it may slide out of the front of the box and descend through the conductor to the assembling-block below. These delivering devices are operated by a rod $k^{12}$, Figs. 9 and 10, extending downward and connected through an elbow-lever $k^{13}$ and link $k^{14}$ to a finger-key $k^{15}$. A spring $k^{16}$, fastened to the frame, bears at its free end against a roller on the rear end of the finger-key and acts to hold the delivery-slides $k^{11}$ and the key normally in an elevated position. When the key is depressed, it depresses the slides $k^{11}$, and when it is released the spring lifts the slide and effects the delivery of the space-bar, the delivery being effected, it will be perceived, not by the depression, but by the release of the key. The advantage of this action lies in the fact, before alluded to, that additional time is given for the passage into the line of a matrix released in advance of a space-bar. If the space-bar were released during the depression of the finger-key, it would sometimes happen that the space-bar, traveling but a short distance, would enter the line in advance of a matrix previously released, but requiring to travel a greater distance to reach the line. The time gained by the new arrangement, although short, is sufficient to prevent the accident above named.

In order to insure the action of the delivery devices and to retard their return movements so that the space-bars may be certain to escape, I adapt the spring $k^{16}$ to underride the roller on the key and complete the stroke of the latter, the action being essentially the same as that of the matrix-delivering keys. The parts are returned to their normal positions by an eccentric $k^{17}$ on the finger-key acting against the roller $e^7$, before mentioned.

*Clamping and casting mechanism.*— The casting mechanism proper, as shown in Figs. 2 and 21, is of essentially the same construction as that in my application, Serial No. 303,396, being composed principally of a vertical wheel O, having the slot or mold proper $o$ cut therethrough from front to rear, and of a melting-pot V, located behind the mold-wheel and provided with a delivery-mouth $v$, adapted to close the rear side of the mold and to deliver molten metal therein under the influence of a pump $v'$ in the pot. The mold-wheel is mounted on a central horizontal journal $o^2$, formed on or attached to an arm $o^3$, extending laterally from one side of the slide $o^4$, extended past the side of the pot and mounted in guides on the main frame, so that the mold-wheel may be carried horizontally forward and backward to and from the line of matrices presented against its face, as in my previous machines. The melting-pot is sustained by upright legs $r^2$, pivoted at their lower ends to the main frame, so that it may swing to and from the mold, and is constantly heated by one or more gas-burners $v^3$, which may be of any appropriate construction. The mold-wheel stands normally with the mold or slot in a horizontal position at its top, and it is while in this position that the matrices are presented against it and the casting operation performed. The mold receives an intermitting rotation through gear-teeth $o^5$ on its back, engaged (see Fig. 2) by a pinion $o^6$ on a horizontal shaft $o^7$, mounted in the main frame and provided at its rear end with a stop-motion pinion $o^8$, engaging corresponding teeth and delay services on vertical wheel $o^9$. While the mold is in this position the line of matrices is lowered by the yoke N in front of its face across the slot or mold proper, as shown in Fig. 21.

In order to clamp the matrices against each other and against the face of the mold and to secure their accurate alignment, I use clamping and aligning devices, practically the same as those in my application, Serial No 303,396, as follows: The top or head of the vise P has a vertical face $p$ to bear against the front of the yoke N and firmly sustain the same against the pressure of the matrices as the mold advances against them from the rear. The head of the vise is also provided with two rearwardly-projecting jaws $p'$ and $p^2$, movable horizontally to the right and left, (see Figs. 21, 25, 26, 29, &c.,) so that the matrices are lowered between them by the descending yoke. After the matrices are in position these jaws are closed together against opposite ends of the line by a screw $p^3$, actuated through a pinion on its end by a vertical rack-bar $p^4$, connected to the lever which operates the justifying-slide. They also serve to cover and close the mold in part, in the event of the matrix-line being short, or entirely if a blank linotype is to be cast, as in the prior machine. As these parts may be identical with those in my previous machine and form no part of my present invention, further description thereof is unnecessary. They act, it will be seen, to hold the matrices in line against the face of the mold and to limit the length to which the line is extended or justified by the movement of the tapered space-bars, which are driven upward between the matrices in the same general manner as in my previous patents.

Heretofore it has been my custom to drive the entire series of space-bars upward simultaneously and uniformly, to effect the justification, by means of a slide rising beneath and against their lower ends. As the space-bars rise they are shifted laterally to a greater or less extent by the lateral movement of the matrices between which they rest. This is due to the fact that the justification commences at one end of the line, and to the fact that the spaces occur in the line at irregular intervals, so that when a space-bar is lifted to increase the space which it fills it causes the matrices to move laterally, so that the space-bars are carried laterally with them to a greater or less extent. The lower ends of the space-bars being in frictional engagement with the lifting device, are held against free lateral movement, and consequently the bars are occasionally sprung or bent. To avoid this difficulty, I now provide a lifting device which acts on the space-bars in succession, commencing at one end of the line, so that each bar is shifted laterally to about the position it finally occupies before it is lifted. The devices for this purpose are shown in Figs. 25, 26, 29, 30, and 31, in which $p^6$ represents the lifting-plate underlying the position which the space-bars occupy in front of the mold. This plate is connected at its opposite ends by links $p^7$ to the top of two vertically-sliding rods $p^8$ and $p^9$, guided in the vise-frame. The rod $p^8$ is connected through a yielding link $p^{10}$ with one arm of a vertically-vibrating lever $p^{11}$, while the rod $p^9$ is loosely embraced by the end of a vertically-vibrating lever $p^{12}$ and provided with a collar $p^{13}$ above the lever. The levers $p^{11}$ and $p^{12}$ are connected through intervening links to the respective weighted levers $p^{13}$ and $p^{14}$, Fig. 2, which act to raise the rods $p^8$ and $p^9$, and thereby carry the lifting-plate $p^6$ against the space-bars. The lifting-levers $p^{11}$ and $p^{12}$ are both controlled as to their rising movement and positively depressed at the proper time, the former by the cam $p^{15}$, Figs. 27 and 32, and the latter by the cam $p^{16}$. These cams are so shaped that the rod $p^8$ first acts to raise one end of the plate $p^6$, and thereby lift the space-bars, as shown in Fig. 29, after which the opposite end of the plate $p^6$ is also elevated, thereby forcing the remainder of the space-bars upward in succession. As the lifting-plate $p^6$ is inclined in the direction toward which the space-bars shift, it offers no resistance to the shifting motion. The plate $p^6$ assumes its horizontal position, Fig. 30, before the clamping devices finally act, and thus places the matrices in substantially the positions they are to occupy while they are still free to move. After the other parts are all in position the rods $p^8$ and $p^9$ are permitted by the cam to rise simultaneously and complete the justification, the final movement of the parts being very slight. The essence of my invention in this regard lies in advancing the space-bars successively, and it will be manifest to a skilled mechanic that the devices herein shown may be modified in many respects or replaced by other devices based on the same principle of operation. After the matrices are in position the mold advances tightly against their rear edges, the melting-pot advances against the mold, and the mold is filled with molten metal, producing the required linotype, after which the melting-pot retreats from the mold, the mold retreats from the matrices, and the clamps release the matrices. The mold-wheel then makes a partial revolution, so that the linotype stands in a vertical position, as shown in Fig. 18, when the motion ceases. While the mold is in this position a horizontally-sliding ejector-blade $o^{16}$, Fig. 32, guided in the main frame, advances through the mold and pushes the linotype forward out of the mold into a galley or receiver $v^{17}$, Figs. 1 and 21, at the front of the machine. After this action the ejector retreats and the mold continues its rotation to its first position. By arranging the parts to deliver the linotypes in a vertical position instead of the horizontal position, as in my previous machines, I am enabled to extend the ejector and its supports past one side of the melting-pot, instead of locating them thereunder, and thus I am enabled to use a deeper pot and to secure other minor advantages. As the matrices and space-bars have now performed their functions, the next step is to distribute them, that they may be used again. The first step in this operation is to separate the matrices from the space-bars, which is accomplished by the means now to be described.

Figure 48:
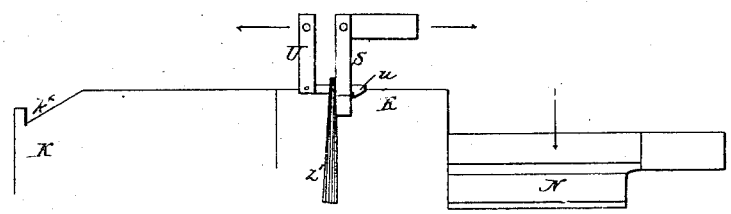
Figure 49:
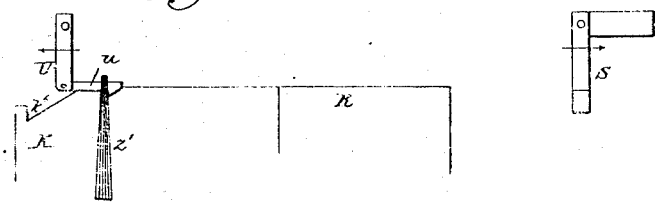

*Separation of matrices and space-bars.*—The matrices sustained in the yoke N are lifted by its rising movement from their position in front of the mold to the level of a horizontal guide R, hinged to the main frame above the level of the assembling mechanism, (see Figs. 1, 39, and 40,) so that it may be rocked slightly forward and backward. This guide R, which registers for the time being with the elevated yoke, so as to form in effect a horizontal continuation thereof, extends to the right and is slotted internally to admit both the matrices and space-bars, which are carried from the yoke by the horizontally-moving slide S. The guide R is of the sectional form shown in Figs. 38, 39, and 40, being provided with longitudinal grooves $r$, which engage the ears of the space-bars, so as to hold them from rising, while the matrices of less width may be lifted freely from between the space-bars. In order to lift the matrices and leave the space-bars behind within the guide R, I provide a longitudinally ribbed or toothed plate $t$, suspended by a link $t'$ from the end of the swinging arm T, which is jointed to the main frame, so that it may swing vertically and carry the ribbed plate from a position within the guide R to a position at the end of the distributer, hereinafter described. The plate $t$ being seated within the guide R, as shown in Figs. 39 and 40, is straddled by the upper ends of the matrices when they are shifted laterally into the guide R, (shown in Figs. 39 and 47,) the teeth on the plate engaging the teeth in the matrix, as plainly shown in Fig. 39, so that when the arm T swings upward, carrying the plate $t$, the latter lifts the matrices out of the guide R, as shown in Fig. 40, carrying them thence upward to the distributer, while the space-bars remain in the guide, as shown in Figs. 40 and 48. The guide R, Fig. 1, is extended to the right and connects with the space-bar-receptacle K. A hook $u$, Fig. 49, moving from right to left, overrides the upper ends of the space-bars after the separation of the matrices, and engaging the last bar on the left sweeps the entire series of space-bars through the guide R to the receptacle K. This action is plainly illustrated in Figs. 48 and 49, which, however, being taken from the rear, shows the movement from the left instead of the right.

The slide S for shifting the line into the guide, and the hook $u$ are operated in the manner shown in Fig. 43. The shifting-slide is connected by link $s$ to the upper end of a lever $s'$, mounted on a rock-shaft $s^2$ in the main frame. The shaft is provided with a short arm $s^3$, connected by link $s^4$ to an arm $s^5$ on a second rock-shaft $s^6$, which in turn carries a second arm $s^7$, connected by a link $s^8$ to a slide-block $s^9$, carrying the hook $u$. A strong spring $s^{10}$, attached to the frame, actuates the arm $s$ and tends to move the parts in the direction indicated by the arrows. The rock-shaft $s^2$ carries at its rear end an arm $s^{11}$, Figs. 32 and 44, acting against a cam-face on the side of a vertical wheel $s^{12}$, which acts to move the parts in opposition to the spring. Viewed from the rear of the machine, the parts stand normally in the position shown in Figs. 43 and 46. The slide S shifts the entire line into the guide, while at the same time the hook $u$ overrides the line and passes to the right. The matrices are then lifted out and the hook $u$ shifts the space-bars to the left, the slide S at the same time returning to its normal position. The guide R is hinged, as before described, in order that the matrices may be lifted out by the swinging arm without danger of their binding or cramping in the guide. The arm T is provided with a downward projection $t^6$, which rides against the inner faces of vertical plates $r^3$ on the guide, so that as the arm rises it tips the guide backward, as shown in Fig. 40, the guide immediately falling forward to its vertical position after the projection $t^6$ rises therefrom. The plates $r^3$ are pivoted at their upper ends and beveled on the rear side, as shown in Figs. 36, 39, and 40, so that when the arm T again descends they will separate and permit the projection $t^6$ to pass between them, after which they again fall back to their original positions. This action is illustrated by dotted lines in Fig. 36. After the matrices are lifted by the arm $t$ they are presented to the distributer and returned thereby to the top of the magazine.

*Matrix-distributing mechanism.*—The distributer proper consists of a rail extended horizontally over the mouths of the magazine-channels and provided with longitudinal ribs, varied in number and arrangement at different points in its length, so that matrices slipped thereon from one end will be suspended therefrom by the teeth on their upper ends until they arrive over the mouths of the appropriate channels, when their teeth will disengage and permit them to fall. The construction of this rail is practically identical with that represented in Letters Patent No. 347,629, issued to me on the 17th day of August, 1886, and the matrices are moved along the rail by means of screws lying adjacent thereto and engaging the edges of the matrices, after the manner represented in my application, Serial No. 303,396. The present invention, however, includes certain details of the mechanism for presenting the matrices to the rail and screws, which I will now describe. When the elevator-arm T lifts the matrices, it presents the suspending-plate $t$ in line with a short stationary rail $t'$, (see Figs. 58 and 59,) which is toothed horizontally to engage and sustain the matrices, which are carried laterally thereon from the support $t$ by the slide W, Figs. 1 and 2. As the matrix-line is urged forward to the right, the foremost matrix encounters at its upper and lower ends lips or shoulders $t^2$ and $t^3$, by which the matrix is prevented from escaping or falling accidentally from the end of the line. The shoulders $t^3$ are continued to the right, (see Figs. 53, 53$^a$, and 58,) forming rails or supports for the shoulders to the matrices as they are lifted one after another over the detaining-shoulders $t^2$ $t^3$ in their course toward the distributer-rail. As shown in Fig. 53, a short opening is left between the end of the fixed rail $t'$ and the distributer-rail $x$. The rail $t'$ serves to hold down the matrices in the line, except the one at the end, which rests against the shoulders $t^2$ and $t^3$ beyond the end of the rail $t'$. Being thus sustained, the end matrix is free to rise under a moderate pressure, so that it may pass the detaining-shoulders $t^2$ $t^3$ and descending move forward, as in Fig. 53$^a$, between the threads of the feed-screws $x$ $x$, hereinafter described, by which it is carried forward into engagement with the adjacent end of the distributer-rail. This lifting of the matrices that they may pass to the distributer-rail is effected by a vertically-moving dog $x'$, (see Figs. 50, 51, 52, and 53,) connected by pivot $x^2$ to the end of lever $x^3$. This lever is pivoted to the frame at $x^4$, urged constantly upward by a spring $x^5$, and depressed at frequent intervals by a cam $x^6$, acting against a roller on the lever. The dog $x'$ is held in operative position by a spring $x^7$, so that its upward end may move toward the distributer-rail, if required. The upper end of the dog rests normally beneath the foremost matrix in the line, as indicated in Fig. 53$^a$, and when it rises it lifts the matrix so that it may escape over the shoulders $t^2$ $t^3$, after which the dog descends and engages beneath the next matrix, which has in the meantime advanced with the line and against the detaining-shoulders. As soon as the matrix passes over the shoulders it is engaged at the end by the square thread of the two longitudinal screws $x^8$ and $x^9$, and also engaged at the lower end by a third screw $x^{10}$, these screws being positively revolved in the proper direction to carry the matrices along the distributer-rail to the points at which they fall therefrom. The screws are timed in their revolution so that the ends of their threads pass behind and engage each matrix as soon as it has passed over the shoulders $t^2$ $t^3$, the screws serving not only to advance the matrices, but to maintain a separation between them as they are advanced along the rail.

In order to guide the falling matrices into the upper end of the magazine-channels, I hinge to the upper end of the magazine a curved plate $b^{10}$, Fig. 55, having channels which form continuations of those in the magazine, so that each matrix falling from the rail will be guided to its proper place in the magazine. The mouth-piece is held normally in its operative position by a spring $b^{11}$ acting against one of its supporting-arms, as shown in Fig. 55. The descent of each matrix to its original level as it passes from the detaining-shoulders is insured by an overlying pressure-arm $t^{15}$, mounted on a fixed pivot $t^{16}$, and urged downward by a spring-arm $t^{17}$ acting against its pivoted end.

It sometimes happens that a matrix will lodge in the distributer or between the distributer and the magazine proper, or that it will in the course of its descent assume an improper position. In order that this may be detected and that the distributer may be stopped automatically until the operator places the matrix in proper position, I adopt the automatic stop mechanism shown in Figs. 54, 55, 56, and 57, in which $x^{11}$ represents a blade underlying the distributer-rail and extending the entire length thereof. This blade is attached to the lower ends of pendent pivoted arms $x^{12}$, one of which is connected by a link $x^{13}$ to an eccentric $x^{14}$ on one of the screw-shafts, so that when the machine is in action the blade is constantly vibrated to and from the path of the falling matrices, as indicated by the arrows in the several figures. Whenever a matrix assumes an improper position or lodges in the channel, the blade will strike upon it, as shown in Fig. 57, and by forcing the matrix backward cause the latter to force the channel-plate or throat-plate $b^{10}$ downward and outward from its operative position, as plainly shown in Fig. 57. I render this movement of the channel-plate available to stop the feed-screws in the manner following: I gear the feed-screws together at one end by pinions $x^{15}$ and $x^{16}$, Fig. 54, and I mount loosely on the journal of the screw $x^8$ a driving-pulley $x^{17}$, which is recessed to receive and frictionally engage a sliding cone $x^{18}$, attached to pins $x^{19}$, which pass through a pinion on the screw-shaft to a loose collar $x^{20}$, having arms with inclined side faces. A rock-shaft $x^{21}$, Fig. 55, mounted in the frame, carries at one end an arm $x^{22}$ to act upon the collar $x^{20}$, while at the opposite end it carries an arm $x^{23}$, Fig. 57, attached to link $x^{24}$, guided on the frame and arranged to act against an arm $b^{12}$ rising from the throat-plate, as shown. When the parts are in operative position, this arm $b^{12}$, through the intermediate parts, holds the arm $x^{22}$ away from the clutch-collar, allowing the clutch to remain in action under the influence of its contained spring $x^{25}$. When, however, the throat-plate is forced backward by the misplaced matrix, as before explained, it releases the link $x^{24}$, and the arm $x^{22}$ is at once forced downward by a spring $x^{26}$ into the path of the rotating collar, which, riding against the same, is drawn backward thereby so as to disengage the clutch. This having occurred, the operator adjusts the matrix and restores the throat-plate to its original position, thereby disengaging the arm $x^{22}$ and allowing the clutch to again start the distributer.

*Driving connections.*—Motion is imparted to the machine, primarily, by a large band-pulley $a^2$, Figs. 32 and 61, on a horizontal shaft $a^3$, seated in the base of the main frame and connected by pinion $a^4$, Fig. 2, to a gear-wheel $a^5$ on a second shaft $a^6$, mounted at a higher level in the main frame. This second shaft $a^6$ carries all the cam-wheels heretofore referred to as moving the mold, the melting-pot, the justifying-levers, the elevating-arm, and other parts. In short, all the principal movements of the machine are effected by cams on the shaft $a^6$.

In order to stop and start the machine, either automatically or by hand, as may be required, the driving-pulley $a^2$, Fig. 61, is mounted to turn loosely on its shaft and its hub provided with pins or projections to engage corresponding projections on a sliding non-rotating clutch $a^7$, applied to the end of the shaft. A pin $a^8$, attached to this clutch, extends centrally into the shaft and is encircled by a spiral spring $a^9$, which tends to cause the engagement of the clutch. At its inner end the rod is connected by pins $a^{17}$, passing outward through slots to a collar $a^{10}$, which encircles the shaft, and which is acted upon by one end of an angular lever $a^{11}$, pivoted to the main frame. When this lever is moved in the direction indicated by the arrow in Fig. 61, it disengages the clutch and the entire machine stops; but when the lever is released the clutch engages automatically. The clutch-disengaging lever $a^{11}$ has a slotted connection with one end of a sliding bar $a^{12}$, which is extended to the front of the machine and there connected by a link $a^{13}$ to a hand-lever $a^{14}$, pivoted to the main frame, for starting and stopping the parts at will, as hereinafter explained.

To throw the clutch out of action automatically after the wheel $a^6$ has completed one revolution, and thereby completed a linotype, I provide the shaft of the unclutching-lever $a^{11}$ with an upper arm $a^{15}$, having at its end a hook or lip $a^{16}$. I also provide the wheel $l^{11}$ on shaft $a^6$ with a laterally-springing dog $a^{18}$, the end of which is projected beyond the wheel and curved eccentrically, so that as the wheel completes its revolution this eccentric end of the jaw engages the lip $a^{14}$ on the end of arm $a^{15}$, causing the arm to swing in the direction indicated by the arrow, and thereby disconnecting the clutch. An elbow-lever $a^{19}$ is pivoted to the frame with one end in position to engage the jaw $a^{18}$ and its other end in front of a stud $a^{20}$ on bar $a^{12}$. When therefore the hand-lever $a^{14}$ is moved so as to draw the bar $a^{12}$ forward, the stud $a^{20}$ causes lever $a^{14}$ to trip the jaw $a^{18}$ out of engagement with arm $a^{15}$, whereby the clutch is released and permitted to automatically engage under the influence of its spring $a^9$. This is the usual action in starting the transferring and casting devices after the composition of each line of matrices. If it be desired to stop the action before the completion of the revolution, it may be accomplished by moving the hand-lever $a^{14}$, so as to push the bar $a^{12}$ backward, and thereby actuate lever $a^{11}$, so as to disengage the clutch.

The entire composing mechanism and the distributing mechanism proper at the top of the machine are driven constantly and independently of the casting mechanism, which operates intermittingly. The object of this arrangement is to permit the composition of lines following the one at the mold and the distribution of lines preceding the one at the mold to be carried on constantly and automatically without being in any manner dependent upon the action of the casting devices. The preferred connections for this purpose are shown more particularly in Fig. 66 and in part in Fig. 1, in which it will be seen that the main driving-pulley $a^2$, in constant motion, carries on its side a secondary pulley $a^{30}$, which communicates motion through belt $a^{31}$ to pulley $a^{32}$ on a shaft $a^{33}$, lying lengthwise of the machine behind and above the key-board. This shaft $a^{33}$ carries at one end a pulley $a^{34}$, which communicates motion through belt $a^{35}$ to the distributer-screws at the top of the machine. The shaft $a^{33}$ also carries the double-grooved pulley $a^{36}$, from which driving-belts $a^{37}$ are carried to the driving-pulleys on the rolls $e^7$ of the key-board, as shown in Fig. 8. The shaft $a$ is further provided, as shown in Figs. 13, 14, and 66, with a beveled pinion $a^{38}$, driving a pinion $a^{39}$ on a shaft $a^{40}$, which is extended forward and provided with a pulley $a$, which, through belt $a'$, communicates motion to pulley $a^{41}$ on the shaft $a^{42}$, which carries the pulley $h$, operating the inclined assembling-belt. This shaft $a^{44}$, through a belt $h^5$ on its opposite end and belt $h^4$, drives pulley $h^3$ on the shaft which carries the triangular assembling-wheel $h^2$ and the cam to operate the space-bar detent $k$.

In order to prevent the discharge of molten metal improperly into the operative parts of the machine, in the event of anything occurring to prevent the proper presentation of the matrices to close the mold, I propose to combine with the driving-clutch of the machine a controlling device operated by the yoke, which presents the matrices to the mold, so that if the yoke fails to descend to its proper place with the matrices the clutch will be automatically thrown out of action and further operation of the machine prevented. In this preferred form this automatic stopping mechanism is shown in Figs. 1, 21, 32, 33, 60, and 61, in which $a^{22}$ represents a lever centrally pivoted to the frame and acting at one end against the bar $a^{12}$ to throw the clutch out of action, while at the opposite end it rests against the lower end of an upright bar $a^{23}$. This bar is sustained by a spring $a^{24}$, its upper end sliding vertically through the vise, which clamps the matrices so as to be acted upon by the descending yoke N, while its lower end is free to swing forward and backward to a limited extent in order to actuate the lever $a^{27}$. The bar $a^{23}$ is urged rearward by a spring $a^{27}$, and midway of its length is provided with a dog or projection $a^{25}$ to engage a horizontally-sliding plate $a^{26}$, through which the bar passes. This plate is extended rearward in position to be acted upon and pushed forward by the mold-wheel O, Fig. 33, as the latter advances to its operative position. When the yoke N descends to the proper limit and presents the matrices in the proper manner to the mold, it pushes the bar $a^{23}$ downward, carrying the shoulder $a^{25}$ clear of the slide $a^{26}$, as shown in Fig. 21, so that the slide when pushed forward by the mold has no effect whatever upon any of the other parts. In other words, the clutch mechanism is permitted to operate. When, however, the yoke N rises with the matrices, the bar $a^{23}$ is lifted by its spring until its shoulder is in position to engage the slide $a^{26}$, as shown in Fig. 60. If therefore the yoke fails to descend to the proper position with the matrices, the advancing mold, forcing the slide $a^{26}$ forward, causes the latter to swing the bar $a^{23}$ forward, and thereby disengage the driving-clutch through the medium of the lever $a^{22}$ and its connections, already described.

*Operation.*—The machine is operated as follows: The attendant depressing successively the finger-keys, which represent the required characters, thereby causes the matrices to be discharged from the mouth of the magazine B, whence they descend through the channel G to the belt H, by which they are delivered one after another in an upright position side by side into the assembling-block I, in which they are advanced in close order by the rotary block $h^2$ acting against the last matrix. From time to time space-bars are delivered into the line by means of the appropriate finger-key. After the composition of the line is completed the assembling-block I is lifted and the line of matrices thereby carried within the grasp of the shifter-arms L L', which immediately carry the matrices to the left through the guide M into the yoke N, which at once descends with them to the front of the mold, which assumes it normal position. As soon as the matrix-line has completed its descent, the mold moves forward toward the matrices. The first steps in the justification—that is to say, in the lifting of the space-bars—now occur. It is frequently desirable to have the machine cast a number of bars in duplicate from the one line of matrices before they are distributed. This is accomplished by the use of a latch $a^{20}$, (shown in Figs. 1, 36, 43, and 45,) pivoted to the main frame, so that it may be set at will in the path of slide U to lock the same in its extreme position at the right of the machine. As this slide is connected by the intermediate parts with the slide S, the latter is prevented from moving to the right, and thus prevented from shifting the matrices out of the yoke when the latter rises. Thus it is that the matrices are again presented by the yoke to the mold without being distributed. The pot advances against the rear face of the mold, the matrices are tightly clamped, the justification completed, and the pump acts to fill the mold with molten metal. The justifying devices now descend, the pump-plunger is lifted, the melting-pot recedes from the mold, and the mold recedes from the matrices. The mold revolves to present the contained linotype in front of the ejector, the elevator-arm T descends to its lower position, and the ejector advances to deliver the linotype. About this time the yoke lifts the matrices and space-bars from the mold to the level of the upper guide R, and the slide S acts to carry the line into said guide to deliver the matrices upon the plate $t$ on the end of the arm T. The arm T now swings upward, carrying the matrices, which are shifted by slide W to the distributer, while the hook $u$, moving to the right, carries the space-bars remaining in the guide R to their receptacle K. In due course the matrices will be distributed, the ejector withdrawn, and the mold rotated to its original position. It is to be observed that the operations of assembling one line of casting from a second and distributing a third are carried on concurrently.

I do not claim herein the matrix-clamping jaw arranged to close the front of the mold in whole or in part to produce a blank surface on the linotype, as this is the subject of claims in application, Serial No. 303,396.

I do not claim herein means for preventing the distribution of the assembled matrices, so that repeated casts may be produced from one line, as this feature is claimed in a divisional application filed by me on the 12th day of August, 1890.

Having described my invention, what I claim is—

1. In a composing mechanism for matrices and type, the magazine consisting of two separated parallel plates provided in their proximate faces with independent complementary grooves extending side by side from end to end, whereby they are adapted to retain and guide the edges of the matrices, leaving their side faces exposed and free from wear.

2. In combination with the main frame, the channeled detachable magazine having the escapement-levers and pins mounted in and sustained by its lower end, whereby the magazine and its contents are adapted for ready removal from the machine without disturbing or disconnecting the parts of the escapement.

3. The magazine consisting of the upper and lower separated channeled plates, the channels of each plate arranged in converging lines and each channel being of uniform width except at the upper end and there flared or widened, whereby the matrices are permitted to enter freely, prevented from overriding each other, and guided without wear on their side faces.

4. In combination with the escapement-lever having the hooked end, the operating-rod engaged therewith, and the spring to maintain the engagement.

5. In combination with the escapement-lever, its actuating-rod, the finger-key to move said rod, a spring $e^2$, acting to continue the movement of the rod initiated by the key, and the roller and eccentric to return the rod to its original position.

6. In combination with the main frame, a detachable magazine, a series of escapement-levers pivoted to and removable with the magazine, and a series of lever-operating rods permanently mounted in the main frame and detachably interlocked with the escapement-levers, whereby the magazine and its escapement may be removed without removing the rods.

7. In combination with the magazine, the centrally-pivoted escapement-lever and its pins, the spring acting on said lever to elevate the lower pin, the rod to reverse the position of the lever, the finger-key acting on the rod, a spring acting to continue the movement of the rod initiated by the finger-key, and positively-acting mechanism to return the rod.

8. In combination with a matrix-delivering escapement and a finger-key connection to actuate the same, a spring called into action by the initial movement of the finger-key and acting in turn to complete the movement of the escapement, whereby such movement is instantly effected, although the key may be prematurely released.

9. In combination with a series of type-discharging escapements, an independent finger-key connected with each escapement, a spring independently applied to continue the movement of each escapement initiated by the finger-key, and means for restoring the parts automatically to their normal positions.

10. In combination with a series of type-discharging escapements, a series of independent finger-keys connected with the respective escapements, a series of springs arranged to complete the movement of the respective escapements initiated by its finger-key independently, and mechanism common to the series for restoring the keys and escapements to their normal conditions in the order in which they are operated.

11. In combination with the finger-key, the escapement-actuating rod having the projection $e^4$, the spring-actuated roller bearing upon said projection, the cam carried by the rod, and the roller $e^7$ to actuate the cam.

12. In combination with the two rows or ranks of escapement-rods, the cams attached thereto, the overlying rollers to act upon the cams, the actuating-springs, and the anti-friction rollers located in rear of the respective rods, as described and shown.

13. In combination with the space-bar receptable K and its slides to deliver the bars, the finger-key connected with said slides, the spring to move the key in its inactive direction, and the roller and eccentric to move it in the reverse direction, whereby the space-bars are delivered during the rising motion of the key.

14. The space-bar receptacle having the top and bottom shoulders to retain the bars, in combination with the vertical slides to deliver the bars over the shoulders, a finger-key to depress the slides, and a spring to elevate them.

15. In combination with the channeled assembling-block or support for the matrices, the inclined traveling belt H, the inclined guide to deliver the matrices from the belt into the block, and the angular wheel acting through a slot in the guide from the rear to advance the matrices within the block and beyond the guide.

16. The channeled assembling-block having the bottom shoulders $i^2$, in combination with the inclined guide-plate $h$, adapted and arranged to direct the descending matrices over the top of the shoulders into the assembling-block, that they may descend against the inner faces of the shoulders and be retained thereby.

17. In combination with the assembling-block or support in which the matrices are aligned, the channel $k$, through which the space-bars are delivered, the finger $k'$ to check the descent of the space-bars, and mechanism, substantially as described, to vibrate said finger, whereby the improper insertion of the spaces in advance of the matrices is prevented.

18. The combination of the magazine, the inclined traveling belt H, acting to convey the matrices delivered from the magazine to the assembling-block, the space-bar receptacle, devices for delivering the space-bars thence to the assembling-block, and an intermittingly-acting detent located between the receptacle and the assembling-block to check the descent of the space-bars, whereby a matrix delivered from the magazine is permitted to reach the assembling-block with certainty in advance of a subsequently-released space-bar.

19. In combination with the vertically-moving assembling-block and the shifter to carry the matrices therefrom, the latch to hold the assembling-block down, arranged to be actuated by the returning shifter, whereby the assembling-block is prevented from rising until the shifter is in proper position to receive the line of matrices.

20. In combination with the vertically-movable assembling-block in which the matrices are aligned, a latch to prevent vertical movement of said block until it is released.

21. The assembling-block I, slotted to admit the matrices from its side and provided with spring-actuated detents $i'$ to engage the upper ends of the matrices, and the stationary shoulders $i^2$ to engage the lower ends of the matrices.

22. In combination with the assembling-block I, slotted to admit the matrices from one side, detents therein to engage the upper and the lower ends of the incoming matrices, and a yielding resistant J, against which the matrices are advanced, whereby the matrices are held in compact order and prevented from separating either at the upper or at the lower ends.

23. The vertically-movable yoke N to receive the matrices, in combination with the dogs or detents therein to retain the incoming matrices, and the sliding spring-actuated resistant against which the matrices are advanced.

24. The yoke N, slotted to receive the line of matrices, in combination with the U-shaped sliding resistant therein, and the spring-actuated pinion engaging said resistant.

25. In combination with a vertically-movable yoke adapted to sustain the line of matrices and space-bars, the elevated guide R adapted to receive the line from the yoke, and the space-bar receptacle K, arranged directly at the end of the guide R as a continuation thereof, whereby the space-bars may be delivered into the receptacle solely by a lateral movement.

26. In combination with the vertically-movable yoke adapted to sustain the line of matrices and space-bars, the elevated guide R to receive the line of matrices and space-bars from the yoke, and the vertically-movable toothed plate $t$, adapted to engage the matrices and remove them from the guide R, leaving the space-bars behind.

27. In combination with the guide R, adapted to receive the line of matrices and space-bars, the vertically-movable toothed plate $t$ to remove the matrices, and the laterally-movable hook or carrier $u$ to remove the space-bars.

28. The stationary guide R, on which the space-bars may be delivered in series, in combination with the space-bar receptacle at its end, and the laterally-movable hook or carrier $u$, whereby the series of space-bars are swept from the guide into the receptacle.

29. In combination with the vertically-movable yoke to sustain the line of space-bars and matrices, the guide R to receive said line, the slide $s$ to shift the line from the yoke into the guide, the movable ribbed plate $t$ to remove the matrices, and the hook or carrier $u$ to remove the space-bars.

30. In combination with the guide R, in which the matrices and space-bars are received, the slide S, the hook $u$, and the connected levers for moving the slide and hook simultaneously in reverse directions.

31. In combination with a guide R, the slide S, the hook or carrier $u$, the connected reversely-moving levers for operating said parts, the spring acting to move the parts in one direction, and the cam-wheel and intermediate connections for moving them in the opposite directions.

32. In combination with the spring-arm T and its toothed plate $t$ to lift the line of matrices, the guide R, hinged to the frame, as described, whereby it is permitted to tip backward and permit the easy withdrawal of the matrices.

33. In combination with the vertically-swinging arm T, having projection $t^6$ and the toothed plate $t$ jointed thereto, the matrix-supporting guide R, hinged to the frame and provided with the yielding spring-actuated plates $r^3$ to engage the projection on arm T, whereby the tipping of the guide is effected in an easy and positive manner.

34. In combination with a series of matrices and intermediate space-bars provided with suspending-shoulders extending beyond the edges of the matrices, a channeled guide in which said matrices and space-bars are supported, and lifting device, substantially as described, to engage the series of matrices and remove them simultaneously from the guide, leaving the space-bars behind.

35. The vertically-movable yoke adapted to sustain a line of matrices and space-bars, in combination with the elevated guide R, a slide to transfer the line from the yoke to the guide, a vertically-swinging arm T, provided with a plate to engage the series of matrices and lift them from the guide R to the distributer, a space-bar receptacle K, and a hook or carrier to deliver the space-bars from the guide R to the receptacle.

36. In combination with a line of matrices, means for sustaining the same in line, a series of tapered spaces seated in the line, and an operating mechanism acting to advance the space-bars endwise progressively one after another.

37. In combination with a line of matrices and tapered space-bars therein, a movable pushing device which advances with its face in a position oblique to the line of matrices, whereby it is caused to start the space-bars successively.

38. In combination with a line of matrices and tapered space-bars therein, a suitable support for the line, a plate to advance the space-bars through the line, and means, substantially as shown, for advancing said plate first in a position oblique to the line of matrices and thereafter in a position parallel with the line, whereby the space-bars are first started one after another and advanced unequally, but finally advanced uniformly to complete the justification.

39. In combination with the line of matrices and tapered space-bars, suitable supports therefor, the justifying-plate $p^6$, the two rods for advancing the opposite ends of said plate, and mechanism, substantially as shown, operating the rods first successively and thereafter in unison.

40. In combination with the justifying-plate $p^6$, its operating-rods, the levers and weights connected to the respective rods, and the cams to depress the levers against the action of the weights.

41. In combination with the slotted rotary mold-wheel, the ejector to remove the linotype in a vertical position from the mold, a galley or receptacle, and a laterally-vibrating finger whereby the linotypes are advanced into the galley and assembled in an upright position.

42. In a linotype-machine, the combination of the mold, the yoke to present the line of matrices to the mold, a driving-clutch, connecting mechanism through which it operates the machine, and a clutch-controlling device actuated by the yoke, whereby the failure of the yoke to properly present the matrices to the mold causes a stoppage of the machine.

43. In a type-casting machine, a mold, a melting-pot, a pump to supply molten metal thereto, a movable yoke or carrier to present the matrices to the mold, and a clutch through which said parts are driven, in combination with clutch-controlling devices operated upon by the casting mechanism to stop the machine in the event of said parts failing to assume their proper relations.

44. In combination with the vertically-movable yoke N to carry the matrices, the horizontally-movable mold O, the vertically and laterally movable shouldered bar $a^{23}$, acted upon by the yoke, the slide $a^{26}$ to engage said bar acted upon by the mold, a clutch through which the machine is driven, and clutch-operating devices connected with bar $a^{23}$.

45. In combination with the matrix support having shoulders $f^2$ and $f^3$, the lifting-lever $x^3$, carrying the pivoted spring-actuated dog or finger $x'$.

46. In combination with the matrix-guide having shoulders $f^2$ $f^3$ to detain the matrix at the forward end of the line, the lifting-dog acting to raise the matrices over the shoulders, and the overlying rail $t'$, as and for the purpose described.

47. In combination with the distributer-rail, the magazine thereunder, the intermediate hinged throat-plate $b^{10}$, and a spring to sustain the same, whereby the plate is permitted to yield in the event of a matrix lodging in an improper position.

48. In combination with the distributer-rail, the screws to advance the matrices thereon, the clutch through which the screws are driven, the vibrating plate beneath the rail to act upon lodged matrices, the yielding-plate $b^{10}$, and clutch-controlling devices connected to said plate, whereby the matrix lodging between the vibrating blade and the yielding plate is caused to move the latter and thereby operate the clutch to stop the feeding action.

49. A type-distributing mechanism and a clutch for driving the same, combined with a blade vibrating in the path of the matrices, and a yielding-plate connected to the clutch by intermediate devices and also arranged in the path of the matrices, whereby matrices lodging between the plate and the blade are caused to disengage the clutch and stop the distribution.

50. In combination with the distributer-rail, the feed-screws, the pulley and friction-clutch for driving the same, the spring to engage the clutch, the collar carried by the clutch and having the inclined arms, the arm $x^{22}$ to trip the clutch out of action, the yielding throat-plate connected with said arm, and the vibrating blade $x^{11}$, acting in opposition to the yielding plate and in the path of the descending matrix.

51. In combination with the distributer-rail, the two feed-screws on opposite sides thereof to engage the upper ends of the matrices, and the third screw $x^{10}$ to engage the lower ends of the matrices.

52. In a linotype-machine, a supporting-frame, the two matrix-clamping jaws and the screw fixed against end motion acting to move one of the jaws to and fro and provided at the opposite end with a nut to sustain the other jaw normally stationary.

In testimony whereof I hereunto set my hand, this 6th day of November, 1889, in the presence of two attesting witnesses.

OTTMAR MERGENTHALER.

Witnesses:
PHIL T. DODGE,
T. I. ELLIOTT.